(12) United States Patent
Yoshida

(10) Patent No.: US 9,154,651 B2
(45) Date of Patent: *Oct. 6, 2015

(54) CONFIGURING APPARATUS, IMAGE OUTPUT APPARATUS, METHODS OF CONTROLLING THE SAME, AND PROGRAM

(71) Applicant: Canon Kabushiki Kaisha, Tokyo (JP)

(72) Inventor: Masashi Yoshida, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,063

(22) Filed: Oct. 17, 2014

(65) Prior Publication Data

US 2015/0036002 A1 Feb. 5, 2015

Related U.S. Application Data

(63) Continuation of application No. 12/936,220, filed as application No. PCT/JP2009/062074 on Jun. 25, 2009, now Pat. No. 8,902,445.

(30) Foreign Application Priority Data

Jun. 30, 2008 (JP) .................................. 2008-171236

(51) Int. Cl.
*H04N 1/00* (2006.01)
*H04N 5/77* (2006.01)
*H04N 1/32* (2006.01)
*H04N 1/327* (2006.01)
*H04N 5/907* (2006.01)
(Continued)

(52) U.S. Cl.
CPC ....... *H04N 1/00347* (2013.01); *H04N 1/32106* (2013.01); *H04N 1/32702* (2013.01); *H04N 1/32767* (2013.01); *H04N 1/32789* (2013.01); *H04N 5/77* (2013.01); *H04N 5/772* (2013.01); *H04N 5/907* (2013.01); *H04N 9/8042* (2013.01); *H04N 2101/00* (2013.01); *H04N 2201/0036* (2013.01); *H04N 2201/0055* (2013.01); *H04N 2201/0082* (2013.01); *H04N 2201/0084* (2013.01); *H04N 2201/3204* (2013.01); *H04N 2201/3274* (2013.01)

(58) Field of Classification Search
USPC ....................... 358/1.13, 1.14, 1.15, 1.16, 520
See application file for complete search history.

(56) References Cited

U.S. PATENT DOCUMENTS 6,930,709 B1   8/2005  Creamer et al. ........... 348/211.3
7,697,892 B2   4/2010  Komoriya ....................... 455/39
8,040,384 B2  10/2011  Mayuzumi ................. 348/211.3

(Continued)

FOREIGN PATENT DOCUMENTS

EP   1 429 533 A2    6/2004
JP   11-298552 A    10/1999

(Continued)

*Primary Examiner* — Allen H Nguyen
(74) *Attorney, Agent, or Firm* — Fitzpatrick, Cella, Harper & Scinto

(57) ABSTRACT

If connection to an output apparatus is detected, a configuring apparatus acquires information about the output apparatus. If disconnection of communication connection with the output apparatus is detected, the configuring apparatus makes various configurations based on the acquired information. If communication connection with the output apparatus is detected again after the configuration, the configuring apparatus transmits the configured information to the output apparatus.

23 Claims, 14 Drawing Sheets

(51) Int. Cl.
  *H04N 9/804* (2006.01)
  *H04N 101/00* (2006.01)

(56) References Cited

U.S. PATENT DOCUMENTS

| | | |
|---|---|---|
| 2001/0034774 A1 | 10/2001 | Watanabe et al. ............. 709/217 |
| 2001/0035974 A1 | 11/2001 | Sakamoto ................... 358/1.14 |
| 2003/0174886 A1 | 9/2003 | Iguchi et al. ................. 382/167 |
| 2004/0070672 A1 | 4/2004 | Iwami et al. ................ 348/207.2 |
| 2005/0007617 A1 | 1/2005 | Tanaka et al. ................ 358/1.13 |
| 2006/0125867 A1 | 6/2006 | Sakuda et al. .................. 347/19 |
| 2007/0135112 A1 | 6/2007 | Lessing ........................ 455/418 |
| 2008/0144144 A1 | 6/2008 | Smithson ...................... 358/520 |
| 2008/0284855 A1 | 11/2008 | Umeyama et al. ......... 348/207.1 |
| 2009/0323108 A1 | 12/2009 | Shimma ....................... 358/1.15 |

FOREIGN PATENT DOCUMENTS

| | | |
|---|---|---|
| JP | 2003-108461 A | 4/2003 |
| JP | 2004-129218 A | 4/2004 |
| JP | 2005-020305 A | 1/2005 |
| JP | 2005-094700 A | 4/2005 |
| JP | 2005-142652 A | 6/2005 |
| JP | 2006-277720 A | 10/2006 |
| WO | WO 2007/007758 A1 | 1/2007 |

F I G. 13
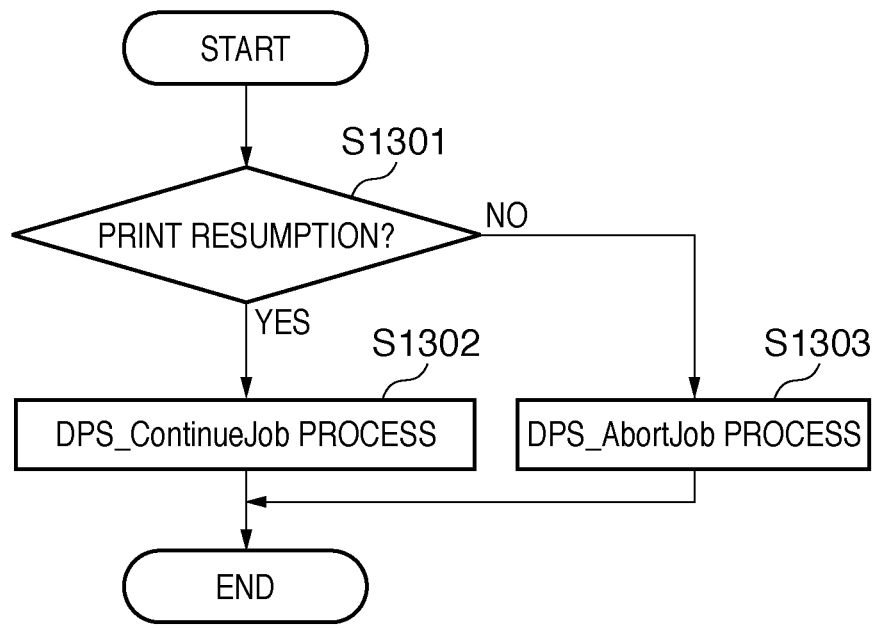

CONFIGURING APPARATUS, IMAGE OUTPUT APPARATUS, METHODS OF CONTROLLING THE SAME, AND PROGRAM

CROSS REFERENCE TO RELATED APPLICATION

This application is a continuation of U.S. application Ser. No. 12/936,220 filed on Oct. 4, 2010, which is a National Stage of International Patent Application No. PCT/JP2009/062074, filed Jun. 25, 2009, which claims priority of Japanese Patent Application No. 2008-171236, filed Jun. 30, 2008. The entire disclosures of these prior applications are incorporated by reference herein.

TECHNICAL FIELD

The present invention relates to a configuring apparatus, image output apparatus, methods of controlling the same, and program.

BACKGROUND ART

Digital still cameras (to be referred to as "digital cameras" hereinafter) and printers which have come into widespread use recently are providing users more opportunities to make a printer at home print images captured by a digital camera. To make a printer print an image captured by a digital camera, it is necessary to communicably connect them. The communication connection for this has shifted from USB communication for connecting devices via a cable to wireless communication that is easy for a user to handle without a cable.

Examples of wireless communication between a digital camera and a printer are wireless LAN, Bluetooth®, and close proximity wireless communication using NFC (Near Field Communication) technology represented by an IC tag. Close proximity wireless communication is advantageous in the following points. Power consumption can be low because the communication range is only several cm. Since communication needs to be done with only a device manually placed within the communication range by a user, cumbersome communication configurations are unnecessary. Close proximity wireless communication is recently increasing its transmission rate and is also expected to be usable for image data transfer when causing a printer to print images captured by a digital camera.

Japanese Patent Laid-Open No. 2004-129218 is known as a useful conventional technique of transferring images captured by a digital camera to a printer for printing using close proximity wireless communication. The technique disclosed in Japanese Patent Laid-Open No. 2004-129218 transmits a message from a printer to a digital camera at the end of image data transmission before termination of printing, and displays, on the display screen of the digital camera, a message to notify that the camera is disconnectable.

For example, to make a printer print images captured by a digital camera, conventionally, communication between the digital camera and the printer is established first. The user then selects print images and makes configurations about paper, the number of sheets, border/borderless, and the like by operating the digital camera and instructs execution of printing. It is necessary to continuously keep the communication established state during the time from communication establishment up to image transmission to the printer. Establishing communication between the digital camera and the printer using close proximity wireless communication in the communication range of only several cm and performing various operations while maintaining the communication established state is considerably detrimental to user's convenience.

DISCLOSURE OF INVENTION

The present invention has been made in view of the above-described problem of the conventional technique, and enables a configuring apparatus for making output configurations of an image output apparatus via close proximity wireless communication to perform operations concerning the output configurations without maintaining the communication established state by the close proximity wireless communication.

According to an aspect of the present invention, there is provided a configuring apparatus for configuring a data output apparatus, comprising: a communication unit which is to connect to the data output apparatus by close proximity wireless communication and communicates with the connected data output apparatus; a detection unit which detects a status of connection with the data output apparatus; the communication unit receiving, from the data output apparatus, information about the data output apparatus if the detection unit has detected establishment of a first connection with the data output apparatus via the communication unit, and an input unit which receives, from a user, input of configurations of data output by the data output apparatus based on the information about the data output apparatus after reception of the information about the data output apparatus, after the input unit has input the configurations of data output, and the detection unit has detected disconnection of the first connection and then establishment of a second connection with the data output apparatus via the communication unit, the communication unit transmitting, to the data output apparatus, the configurations of data output input to the input unit.

According to another aspect of the present invention, there is provided a data output apparatus including a communication unit which communicates with a configuring apparatus by close proximity wireless communication, and a data output unit which outputs data based on configurations of data output transmitted from the configuring apparatus communication-connected by the communication unit, comprising: a detection unit which detects a status of connection with the configuring apparatus, the communication unit transmitting, to the configuring apparatus, information about the data output apparatus if the detection unit has detected establishment of a first connection with the configuring apparatus via the communication unit, and after the communication unit has transmitted the information about the data output apparatus to the configuring apparatus, and the detection unit has detected disconnection of the first connection and then establishment of a second connection with the configuring apparatus via the communication unit, the communication unit receiving the configurations of data output from the configuring apparatus.

According to a further aspect of the present invention, there is provided a configuring apparatus for configuring a data processing apparatus, comprising: a communication unit which is to connect to the data processing apparatus by close proximity wireless communication and communicates with the connected data processing apparatus; a detection unit which detects a status of connection with the data processing apparatus; the communication unit receiving, from the data processing apparatus, information about the data processing apparatus if the detection unit has detected establishment of a first connection with the data processing apparatus via the communication unit, and a display control unit which displays, on a display unit, a configuration screen to input configurations of a data process in the data processing apparatus based on the information about the data processing apparatus if the detection unit has detected disconnection of the first connection, after the configurations of the data process have been input via the configuration screen, and the detection unit has detected establishment of a second connection with the data processing apparatus via the communication unit, the communication unit transmitting, to the data processing apparatus, the configurations of the data process input via the configuration screen.

According to yet further aspect of the present invention, there is provided a configuring apparatus for configuring a data processing apparatus, comprising: a communication unit which is connected to the data processing apparatus by close proximity wireless communication and communicates with the data processing apparatus; a detection unit which detects a status of connection with the data processing apparatus; the communication unit receiving, from the data processing apparatus, information about the data processing apparatus if the detection unit has detected establishment of first connection with the data processing apparatus via the communication unit, and a designation unit which receives, after reception of the information about the data processing apparatus, designation of data to be transmitted to the data processing apparatus based on the information about the data processing apparatus, after the designation unit has designated the data, and the detection unit has detected disconnection of the first connection and then establishment of second connection with the data processing apparatus via the communication unit, the communication unit transmitting, to the data processing apparatus, information to specify the data designated by the designation unit.

According to another aspect of the present invention, there is provided a data processing apparatus comprising: a communication unit which is to connect to a configuring apparatus by close proximity wireless communication and communicates with the connected configuring apparatus; and a detection unit which detects a status of connection with the configuring apparatus; the communication unit transmitting, to the configuring apparatus, information about the data processing apparatus if the detection unit has detected establishment of a first connection with the configuring apparatus via the communication unit, and if the detection unit has detected disconnection of the first connection and then establishment of a second connection with the configuring apparatus via the communication unit, the communication unit receiving, from the configuring apparatus, information to specify data to be transmitted from the configuring apparatus.

According to another aspect of the present invention, there is provided a method of controlling a configuring apparatus for configuring a data output apparatus, the configuring apparatus including a communication unit which is to connect to the data output apparatus by close proximity wireless communication and communicates with the connected data output apparatus, and a detection unit which detects a status of connection with the data output apparatus, the method comprising the steps of: causing the communication unit to receive, from the data output apparatus, information about the data output apparatus if the detection unit has detected establishment of a first connection with the data output apparatus via the communication unit; receiving, from a user, input of configurations of data output by the data output apparatus based on the information about the data output apparatus after reception of the information about the data output apparatus; and after the configurations of data output have been input in the step of receiving the input of the configurations of data output, and the detection unit has detected disconnection of the first connection and then establishment of a second connection with the data output apparatus via the communication unit, causing the communication unit to transmit, to the data output apparatus, the configurations of data output input in the step of receiving the input of the configurations of data output.

According to another aspect of the present invention, there is provided a method of controlling a data output apparatus including a communication unit which communicates with a configuring apparatus by close proximity wireless communication, a data output unit which outputs data based on configurations of data output transmitted from the configuring apparatus communication-connected by the communication unit, and a detection unit which detects a status of connection with the configuring apparatus, the method comprising the steps of: causing the communication unit to transmit, to the configuring apparatus, information about the data output apparatus if the detection unit has detected establishment of a first connection with the configuring apparatus via the communication unit; and after the communication unit has transmitted the information about the data output apparatus to the configuring apparatus, and the detection unit has detected disconnection of the first connection and then establishment of a second connection with the configuring apparatus via the communication unit, causing the communication unit to receive the configurations of data output from the configuring apparatus.

According to another aspect of the present invention, there is provided a method of controlling a configuring apparatus for configuring a data processing apparatus, the configuring apparatus including a communication unit which is to connect to the data processing apparatus by close proximity wireless communication and communicates with the connected data processing apparatus, and a detection unit which detects a status of connection with the data processing apparatus, the method comprising the steps of: causing the communication unit to receive, from the data processing apparatus, information about the data processing apparatus if the detection unit has detected establishment of a first connection with the data processing apparatus via the communication unit; displaying, on a display unit, a configuration screen to input configurations of a data process in the data processing apparatus based on the information about the data processing apparatus if the detection unit has detected disconnection of the first connection; and after the configurations of the data process have been input via the configuration screen, and the detection unit has detected establishment of a second connection with the data processing apparatus via the communication unit, causing the communication unit to transmit, to the data processing apparatus, the configurations of the data process input via the configuration screen.

According to another aspect of the present invention, there is provided a method of controlling a configuring apparatus for configuring a data processing apparatus, the configuring apparatus including a communication unit which is to connect to the data processing apparatus by close proximity wireless communication and communicates with the connected data processing apparatus, and a detection unit which detects a status of connection with the data processing apparatus, the method comprising the steps of: causing the communication unit to receive, from the data processing apparatus, information about the data processing apparatus if the detection unit has detected establishment of a first connection with the data processing apparatus via the communication unit; receiving, after reception of the information about the data processing apparatus, designation of data to be transmitted to the data processing apparatus based on the information about the data processing apparatus; and after the data has been designated in the step of receiving designation of the data to be transmitted to the data processing apparatus, and the detection unit has detected disconnection of the first connection and then establishment of a second connection with the data processing apparatus via the communication unit, causing the communication unit to transmit, to the data processing apparatus, information to specify the data designated in the step of receiving designation of the data to be transmitted to the data processing apparatus.

According to another aspect of the present invention, there is provided a method of controlling a data processing apparatus including a communication unit which is connected to a configuring apparatus by close proximity wireless communication and communicates with the configuring apparatus, and a detection unit which detects a status of connection with the configuring apparatus, the method comprising the steps of: causing the communication unit to transmit, to the configuring apparatus, information about the data processing apparatus if the detection unit has detected establishment of a first connection with the configuring apparatus via the communication unit; and if the detection unit has detected disconnection of the first connection and then establishment of a second connection with the configuring apparatus via the communication unit, causing the communication unit to receive, from the configuring apparatus, information to specify data to be transmitted from the configuring apparatus.

Further features of the present invention will become apparent from the following description of exemplary embodiments with reference to the attached drawings.

BRIEF DESCRIPTION OF DRAWINGS

FIG. 13 is a flowchart illustrating the contents of a PictBridge print resumption process.

BEST MODE FOR CARRYING OUT THE INVENTION

Exemplary embodiments of the present invention will now be described in detail in accordance with the accompanying drawings. The present invention is not limited to the following embodiments. The embodiments of the present invention are the most preferable form of the present invention and are not intended to limit the scope of the present invention.

First Embodiment

Figure 1:
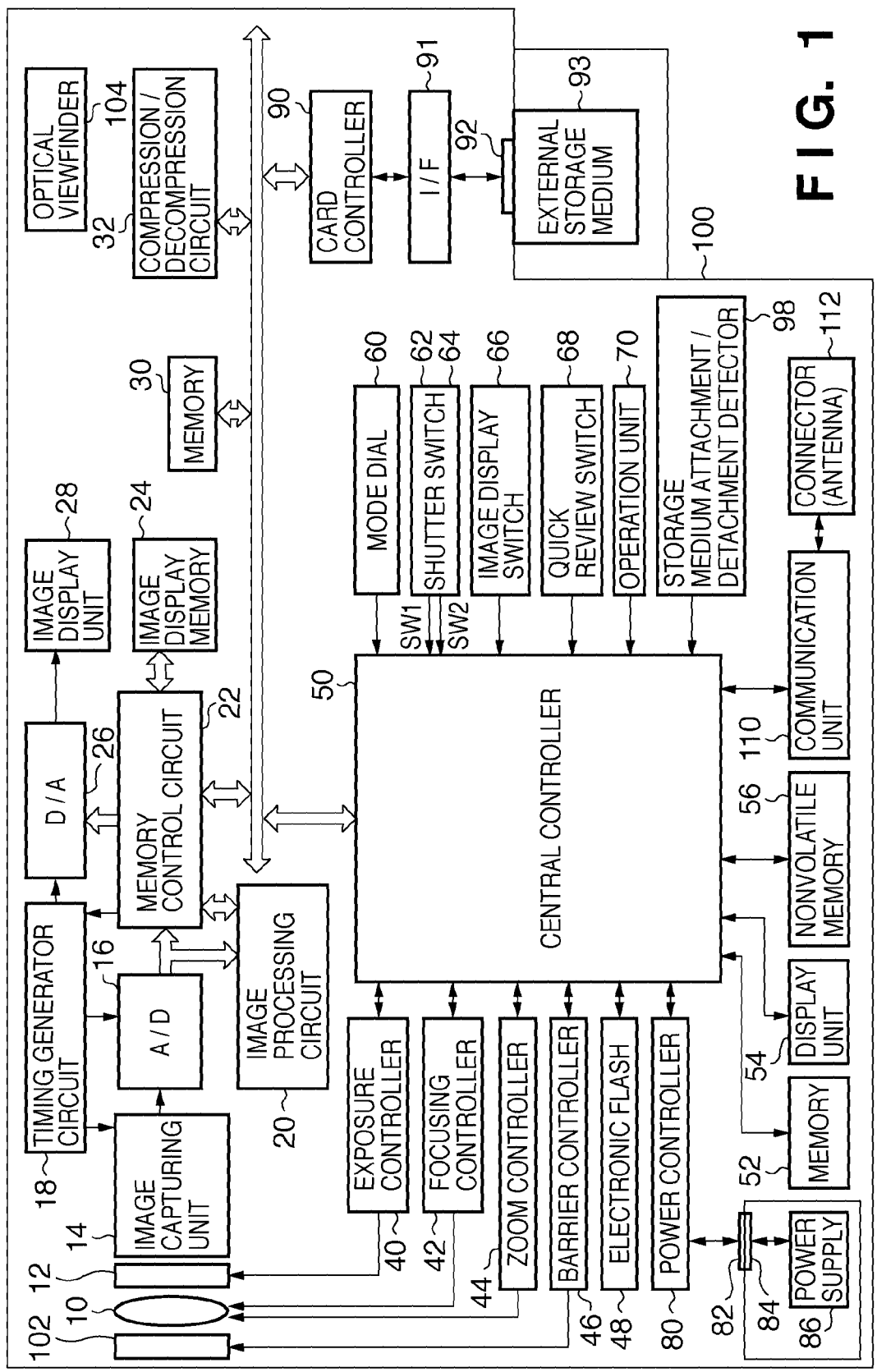
FIG. 1 is a block diagram showing the arrangement of a digital camera according to the first embodiment.

FIG. 1 is a block diagram showing the arrangement of a digital camera 100 according to the first embodiment of the present invention. As shown in FIG. 1, the digital camera 100 causes a memory 30 or an external storage medium 93 to store image data captured by an image capturing unit 14. The digital camera 100 includes, as components for acquiring image data of a captured object image, a photographing lens 10, a shutter 12, the image capturing unit 14, and an A/D converter 16. The photographing lens 10 is an optical lens to form an object image on the imaging plane of the image capturing unit 14. The shutter 12 can adjust the aperture by diaphragm blades and the like. The image capturing unit 14 is a CCD or a CMOS image sensor which converts the object image formed on the imaging plane into an electrical signal. The A/D converter 16 converts the analog signal output from the image capturing unit 14 into a digital signal.

Under the control of a memory control circuit 22 and a central control circuit 50, a timing generation circuit 18 supplies clock signals and control signals to the image capturing unit 14, the A/D converter 16, and a D/A converter 26. An image processing circuit 20 executes image processing such as predetermined pixel interpolation or color conversion for image data output from the A/D converter 16 or image data output from the memory control circuit 22. The image processing circuit 20 also performs a predetermined arithmetic process using the captured image data and outputs the obtained arithmetic result to the central control circuit 50. More specifically, the image processing circuit 20 outputs an arithmetic result such as the contrast value or luminance value of the image to the central control circuit 50. The central control circuit 50 controls an exposure controller 40 and a focusing controller 42 based on the arithmetic result output from the image processing circuit 20 to execute an AF (Automatic Focus) process, AE (Automatic Exposure) process, and EF (Electronic Flash pre-emission) process of TTL (Through The Lens) scheme. The image processing circuit 20 also performs a predetermined arithmetic process using the color information of the captured image data and executes an AWB (Automatic White Balance) process of TTL scheme based on the obtained arithmetic result.

Under the control of the central control circuit 50, the memory control circuit 22 controls the A/D converter 16, the timing generation circuit 18, the image processing circuit 20, an image display memory 24, the D/A converter 26, the memory 30, and a compression/decompression circuit 32. More specifically, the memory control circuit 22 performs write control to write image data output from the A/D converter 16 in the image display memory 24 or memory 30 via the image processing circuit 20. Alternatively, the memory control circuit 22 performs write control to write image data output from the A/D converter 16 in the image display memory 24 or memory 30 directly without intervening the image processing circuit 20.

The image display memory 24 temporarily stores image data to be displayed on an image display unit 28. The D/A converter 26 converts a digital signal into an analog signal. The image display unit 28 is a display device such as an LCD using, for example, TFT. In the digital camera 100, image data temporarily stored in the image display memory 24 is converted by the D/A converter 26 into image data of an analog signal and displayed on the image display unit 28 under the control of the central control circuit 50. Note that in the digital camera 100, the image display unit 28 sequentially displays image data captured by the image capturing unit 14 under the control of the central control circuit 50, thereby implementing an electronic viewfinder function. The image display unit 28 can turn on/off display under the control of the central control circuit 50. The power consumption of the digital camera 100 can largely be reduced in the display OFF state.

The memory 30 is, for example, a RAM (Random Access Memory) for storing captured still image data and moving image data and has a sufficient storage capacity to store a predetermined number of still images or moving images in a predetermined time. This allows the digital camera 100 to quickly write an enormous amount of image data in the memory 30 even upon sequential shooting or panoramic shooting for continuously taking a plurality of still images. The memory 30 also serves as the work area of the central control circuit 50.

The compression/decompression circuit 32 performs image data compression (data coding) or image data decompression (data decoding) using, for example, adaptive discrete cosine transform (ADCT) under the control of the central control circuit 50. For example, the compression/decompression circuit 32 reads out image data from the memory 30, compresses or decompresses it, and writes the processed data in the memory 30.

The exposure controller 40 controls the shutter 12 under the control of the central control circuit 50. For example, the exposure controller 40 controls the shutter 12 in cooperation with an electronic flash 48, thereby controlling the electronic flash brightness. The focusing controller 42 controls focusing of the photographing lens 10 under the control of the central control circuit 50. More specifically, the focusing controller 42 performs drive control associated with the position of the focus lens in the photographing lens 10. For example, using the TTL scheme, the central control circuit 50 controls the exposure controller 40 and the focusing controller 42 based on the arithmetic result obtained by causing the image processing circuit 20 to process captured image data. A zoom controller 44 controls zooming of the photographing lens 10 under the control of the central control circuit 50. More specifically, the zoom controller 44 performs drive control associated with the position of the zoom lens in the photographing lens 10. Under the control of the central control circuit 50, a barrier controller 46 controls opening/closing of a barrier in a protection unit 102 which protects the photographing lens 10 by a cover member (barrier).

The electronic flash 48 emits light to irradiate an object with auxiliary light under the control of the central control circuit 50. The electronic flash 48 may have a floodlighting function of irradiating an object with auxiliary light in AF and an electronic flash brightness control function of adjusting the amount of irradiation light for an object.

The central control circuit 50 reads out program data from a memory 52, expands it on the work area of the memory 30, and controls the operation of the entire digital camera 100 in cooperation with the expanded program data. More specifically, the central control circuit 50 executes, for example, an image capturing process, a captured image object recognition process, a collation process between an object recognition result and management data, and a status data generation process in addition to processes using close proximity wireless communication to be described later. The memory 52 stores, in advance, program data to be executed by the central control circuit 50 and constants and variables to be used for the operation of the central control circuit 50.

A display unit 54 is, for example, an LCD or an LED for displaying texts and images under the control of the central control circuit 50 and displays the operation state of the digital camera 100 or a message. The display unit 54 may include a speaker for outputting voice under the control of the central control circuit 50 and output the operation state of the digital camera 100 or a message in voice. Some components of the display unit 54 may be arranged in an optical viewfinder 104 to notify even a user who looks through it of the operation state of the digital camera 100 or a message.

The display contents of the display unit 54 which are displayed on the LCD include operation states concerning image capturing and those not related to image capturing. Examples of operation states concerning image capturing are single/sequential shooting, self timer, compression ratio, number of recording pixels, number of recorded images, number of recordable images, shutter speed, F-number, and exposure compensation. Electronic flash, red eye mitigation, and macro shooting may also be included. Examples of operation states not related to image capturing are buzzer configuration, clock battery level, battery level, error, information represented by a number with a plurality of digits, attached state of the external storage medium 93, communication I/F operation, and date/time. Of the display contents of the display unit 54, those displayed in the optical viewfinder 104 are in-focus, camera shake warning, electronic flash charge, shutter speed, F-number, and exposure.

A nonvolatile memory 56 is an electrically erasable/programmable memory and can be, for example, an EEPROM (Electrically Erasable and Programmable ROM).

A mode dial 60, first shutter switch 62, second shutter switch 64, image display switch 66, quick review switch 68, and operation unit 70 receive user operation instructions for the digital camera 100. More specifically, switches, dial, touch panel, pointing by user's line-of-sight detection, voice recognition device, and the like are combined so that an operation signal corresponding to a user instruction is output to the central control circuit 50.

The mode dial switch 60 receives an instruction to switch between various function modes such as power off, automatic shooting mode, shooting mode, panoramic shooting mode, playback mode, multiwindow playback/erase mode, and PC connection mode. The first shutter switch 62 is turned on, for example, halfway through the operation of a shutter button (not shown) and receives an instruction to start an operation such as the AF process, AE process, AWB process, or EF process. The second shutter switch 64 is turned on, for example, at the end of the operation of the shutter button and receives an instruction to start the operation of the image capturing process. Note that the image capturing process indicates a series of processes including exposure, development, and recording which are performed under the control of the central control circuit 50. In the exposure process, image data read out from the image capturing unit 14 is temporarily stored in the memory 30 via the A/D converter 16 and the memory control circuit 22. In the development process, the image data temporarily stored in the memory 30 is read out and undergoes arithmetic processes by the image processing circuit 20 and the memory control circuit 22, and the processed image data is stored in the memory 30. In the recording process, the image data which has undergone the development process is read out from the memory 30, compressed by the compression/decompression circuit 32, and written in the external storage medium 93.

The image display switch 66 receives ON/OFF configuration of the image display unit 28. When the user looks through the optical viewfinder 104 and captures an image, the image display switch 66 stops unnecessary power supply to the image display unit 28, thereby reducing the power consumption of the digital camera 100. The quick review switch 68 receives an instruction to enable a quick review function of automatically playing back captured image data immediately after image capturing.

The operation unit 70 includes various buttons such as number keys and character keys and a touch panel and receives various kinds of configuration instructions for the digital camera 100 and instructions for another device connected to the digital camera 100. More specifically, the operation unit 70 includes, for example, a menu button, menu move button, and set button to display various configuration menus and make configurations. Various configuration buttons for image capturing include a macro button, flash configuration button, single shooting/sequential shooting/self timer switching button, exposure compensation button, and shooting image quality selection button. There are also a multiwindow playback page break button and a playback image move button to play back a captured image or select an image to be output, and date/time configuration button to configure the date and the like. Buttons for receiving instructions for another device include configuration buttons to make configurations about images to be output to another device and configurations (e.g., the size of paper to be used for output) about the other device and instruction buttons (e.g., print button) to notify the user of predetermined default configurations.

A power controller 80 includes a battery detection circuit, DC/DC converter, and switch circuit to select a block to be energized (none are shown). The power controller 80 detects a battery connection and its output voltage and controls power supply to the units of the digital camera 100 under the control of the central control circuit 50. Connectors 82 and 84 connect the power controller 80 and a power supply 86, respectively. The power supply 86 is, for example, a primary cell such as an alkaline cell or lithium cell, a secondary cell such as a NiCd cell, NiMH cell, or Li cell, or an AC adapter, and supplies power to the digital camera 100.

A card controller 90 transmits/receives data to/from the external storage medium 93 such as a memory card under the control of the central control circuit 50. An I/F 91 is connected to the external storage medium 93. A connector 92 physically connects the I/F 91 to the external storage medium 93. A storage medium attachment/detachment detector 98 is, for example, a switch for detecting connection of the external storage medium 93 to the connector 92. The storage medium attachment/detachment detector 98 detects whether the external storage medium 93 is attached to the connector 92, and outputs the detection signal to the central control circuit 50.

The protection unit 102 is a barrier which covers the image capturing unit including the photographing lens 10, thereby preventing contaminations and damages to the image capturing unit. The optical viewfinder 104 projects light incident from the photographing lens 10 onto a screen using a pentaprism and a mirror that flip up in exposure of the image capturing unit 14 between the photographing lens 10 and the image capturing unit 14, thereby optically displaying the object image. The optical viewfinder 104 enables the digital camera 100 to perform shooting without using the electronic viewfinder function of the image display unit 28. Some components of the above-described display unit 54 may be provided in the optical viewfinder 104.

A communication unit 110 is connected to an antenna 112 and wirelessly communicates with another device under the control of the central control circuit 50. For example, when the antenna 112 receives a signal transmitted from a communication partner, the communication unit 110 detects the received signal and outputs it to the central control circuit 50. The central control circuit 50 detects, based on the signal output from the communication unit 110, communication establishment by wireless communication from the other device, and starts wireless communication based on a communication protocol preset in, for example, the memory.

The wireless communication by the communication unit 110 and the antenna 112 includes wireless LAN, Bluetooth, and close proximity wireless communication such as NFC technology. Note that "close proximity wireless communication" in this specification means wireless communication based on a communication protocol defined assuming that the communication distance is shorter than 1 m, and more particularly, shorter than several ten cm. As the communication protocols, a "vicinity" communication protocol for a communication distance of about 70 cm or less and a "proximity" noncontact communication protocol for a communication distance of about 10 cm or less are known. More specifically, there are standards such as ISO/IEC 15693, ISO/IEC 14434, and ECMA-340 (ISO/IEC 18092).

Figure 2:
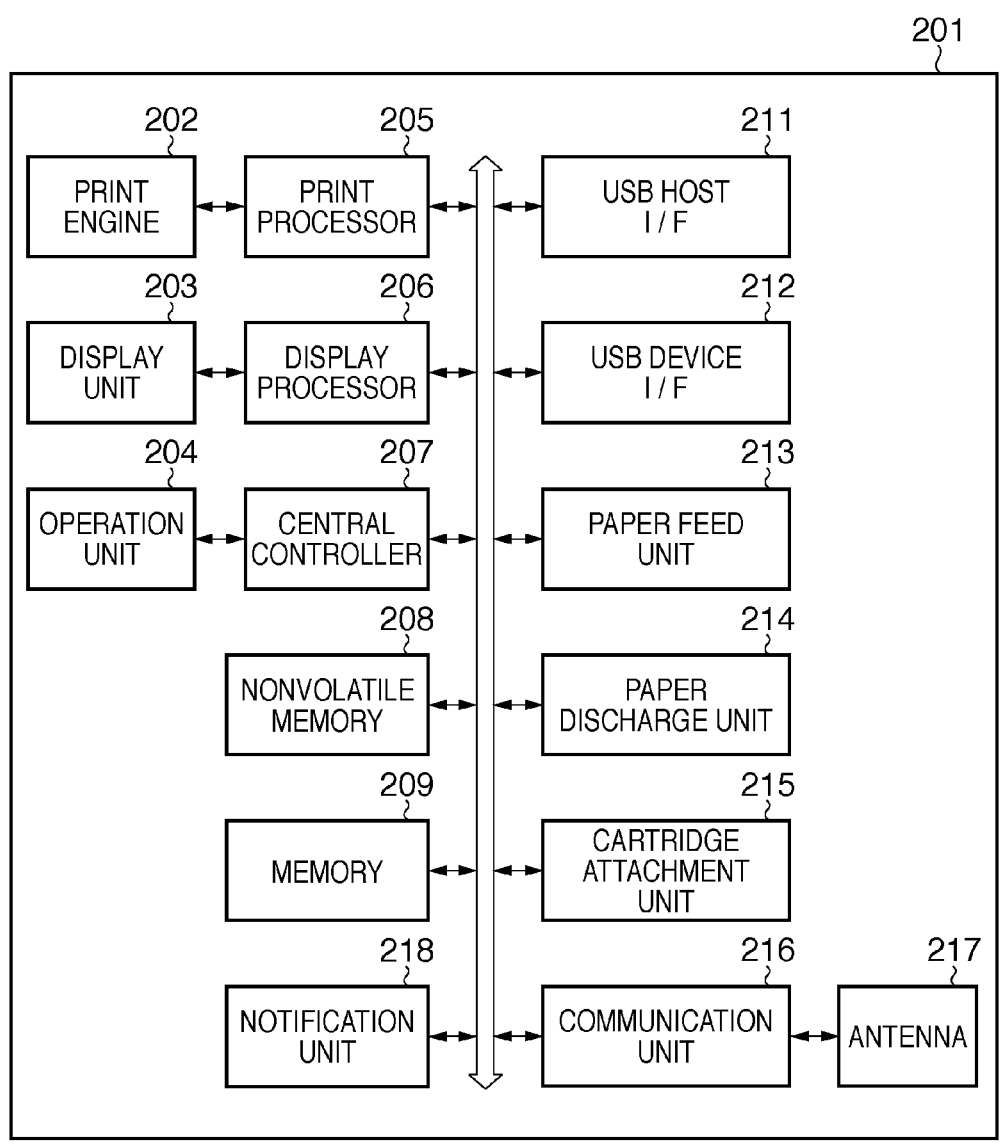
FIG. 2 is a block diagram showing the arrangement of a printer according to the first embodiment.

FIG. 2 is a block diagram showing the arrangement of a printer 201 according to the first embodiment of the present invention. As shown in FIG. 2, the printer 201 is an image output apparatus for performing an image output process by forming an image on a paper sheet, and has a print engine 202 which forms an image on a paper sheet based on input image data under the control of a central controller 207. The print engine 202 is a functional block for actually forming an image on a paper sheet. The print engine 202 supplies a paper sheet from a paper feed unit 213, forms an image on the paper sheet based on data for image formation output from a print processor 205, and discharges the paper sheet after image formation from a paper discharge unit 214. Image formation on the paper sheet by the print engine 202 can be done by the inkjet method or electrophotographic method. The print processor 205 generates the data for image formation under the control of the central controller 207 by performing a predetermined conversion process based on image data and configuration information input from, for example, a communication unit 216.

A display unit 203 is, for example, an LCD or an LED for displaying information for the user based on a signal output from a display processor 206. The display processor 206 generates a display signal for the display unit 203 under the control of the central controller 207. An operation unit 204 includes a combination of switches, dial, touch panel, voice recognition device, and the like and outputs an operation signal corresponding to a user instruction to the central controller 207.

The central controller 207 reads out program data from, for example, a memory 209, expands it on the work area of an internal RAM (not shown), and controls the operation of the entire printer 201 in cooperation with the expanded program data. More specifically, the central controller 207 executes controls communication connection to another device via the communication unit 216 and an antenna 217 and image formation by the print engine 202 based on image data input from the communication-connected device.

A nonvolatile memory 208 is an electrically erasable/programmable memory and can be, for example, an EEPROM. The memory 209 stores, in advance, constants, variables, and program data to be used for the operation of the printer 201.

A USB host interface 211 is connected to an external device such as a digital camera, regarding the printer 201 as a host. A USB device interface 212 is connected to an external device such as a PC (Personal Computer), regarding the printer 201 as a USB device.

The paper feed unit 213 feeds a paper sheet stored in a printer cartridge attached to in a cartridge attachment unit 215 and conveys it to the printer 201 under the control of the central controller 207. The paper discharge unit 214 conveys a paper sheet which has undergone image formation by the print engine 202 and discharges it to, for example, a discharge tray under the control of the central controller 207.

The cartridge attachment unit 215 can receive printer cartridges (not shown) which store paper sheets of various sizes such as the L size and postcard size. The cartridge attachment unit 215 detects attachment/detachment of the printer cartridge and outputs a detection signal to the central controller 207. When executing image formation on a configured paper size, the central controller 207 determines, based on the detection signal output from the cartridge attachment unit 215, the type of the attached printer cartridge. Based on the determination result, the central controller 207 controls the paper feed unit 213 to feed paper sheets from the printer cartridge storing paper sheets of the configured paper size.

The communication unit 216 is connected to the antenna 217 and performs wireless communication with another device under the control of the central controller 207. For example, when the antenna 217 receives a signal transmitted from a communication partner, the communication unit 216 detects the received signal and outputs it to the central controller 207. The central controller 207 detects, based on the signal output from the communication unit 216, communication establishment (communication connection) by wireless communication from the other device, and starts wireless communication based on a communication protocol preset in, for example, the memory. The wireless communication by the communication unit 216 and the antenna 217 includes wireless LAN, Bluetooth, and above-described close proximity wireless communication such as NFC technology.

A notification unit 218 notifies the user of, for example, the printer status by voice output from a speaker (not shown) or display output via the display processor 206 and the display unit 203 under the control of the central controller 207.

Control of the digital camera 100 and the printer 201 is done by single hardware. Alternatively, a plurality of hardware modules may divisionally execute processes so as to function as one controller as a whole.

As described above, the digital camera 100 and the printer 201 can transmit/receive data to/from each other by close proximity wireless communication. Hence, when performing image formation by transmitting image data stored in the digital camera 100 directly to the printer 201 (to be referred to as direct printing hereinafter), data communication associated with the image to be output by the printer 201 can be done by close proximity wireless communication.

Figure 3:
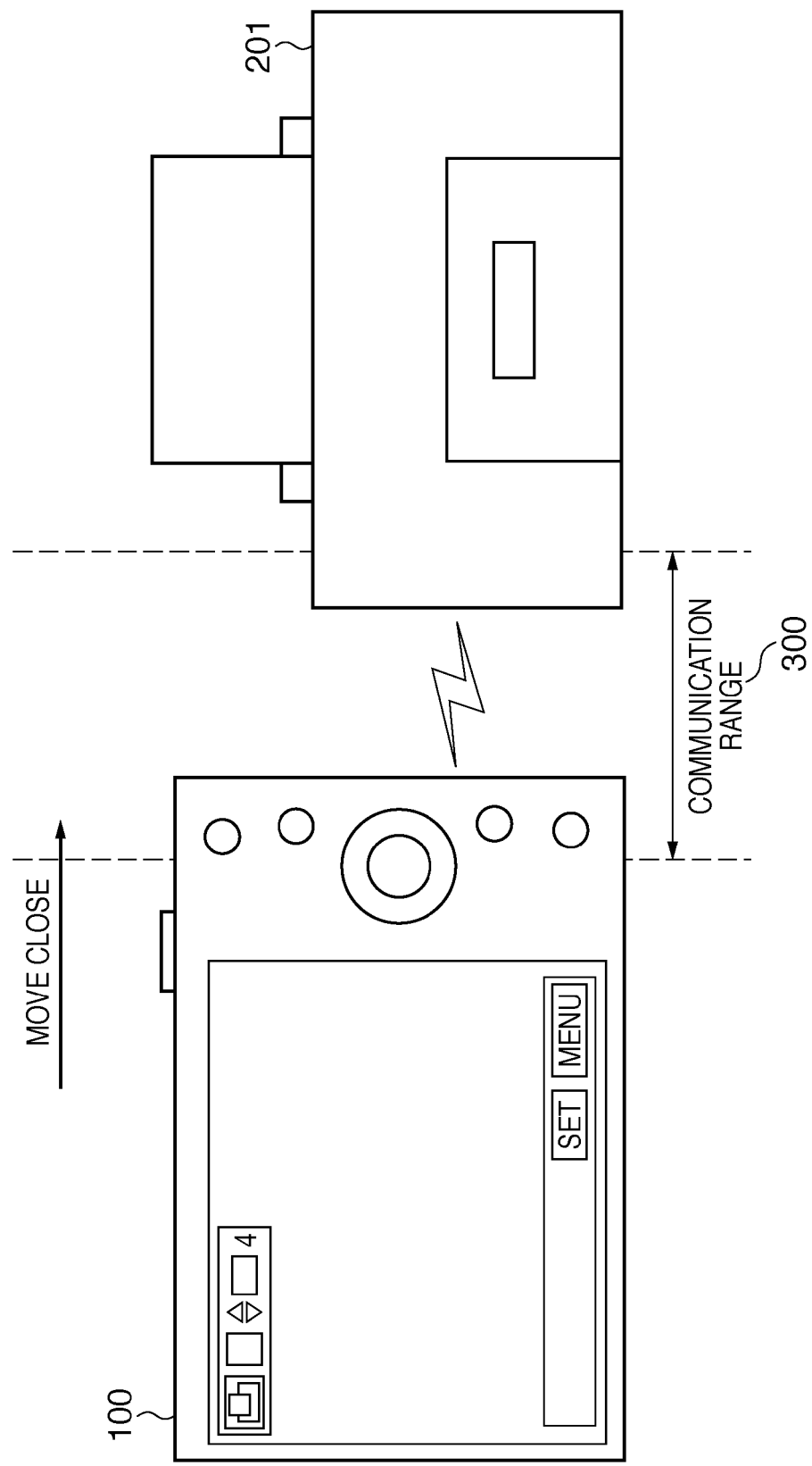
FIG. 3 is a schematic diagram illustrating close proximity wireless communication between the digital camera and the printer.

FIG. 3 is a schematic diagram illustrating close proximity wireless communication between the digital camera 100 and the printer 201. As shown in FIG. 3, the digital camera 100 and the printer 201 start close proximity wireless communication when the distance between them falls within a communication range 300 that allows close proximity wireless communication. More specifically, close proximity wireless communication is possible if the distance between the antenna 112 of the digital camera 100 and the antenna 217 of the printer 201 shortens up to the communication range 300. The communication range 300 is shorter than 1 m, and more particularly, shorter than several ten cm, as described above, and is preferably about 10 cm or less for the "proximity" noncontact communication protocol.

Note that this embodiment assumes that the communication range 300 is about 10 cm or less, and direct printing is performed by data communication between the digital camera 100 and the printer 201 using close proximity wireless communication that allows high-speed data transfer. In close proximity wireless communication, data communication is performed using, for example, an induction field type antenna capable of obtaining a high field intensity only at a communication distance of several cm. For this reason, any third party can hardly intercept the communication even without encrypting communication data. In this embodiment, no encryption key is configured between digital camera 100 and the printer 201. When the distance between the devices shortens up to the communication range 300, wireless communication is established to immediately enable data communication.

Figure 4:
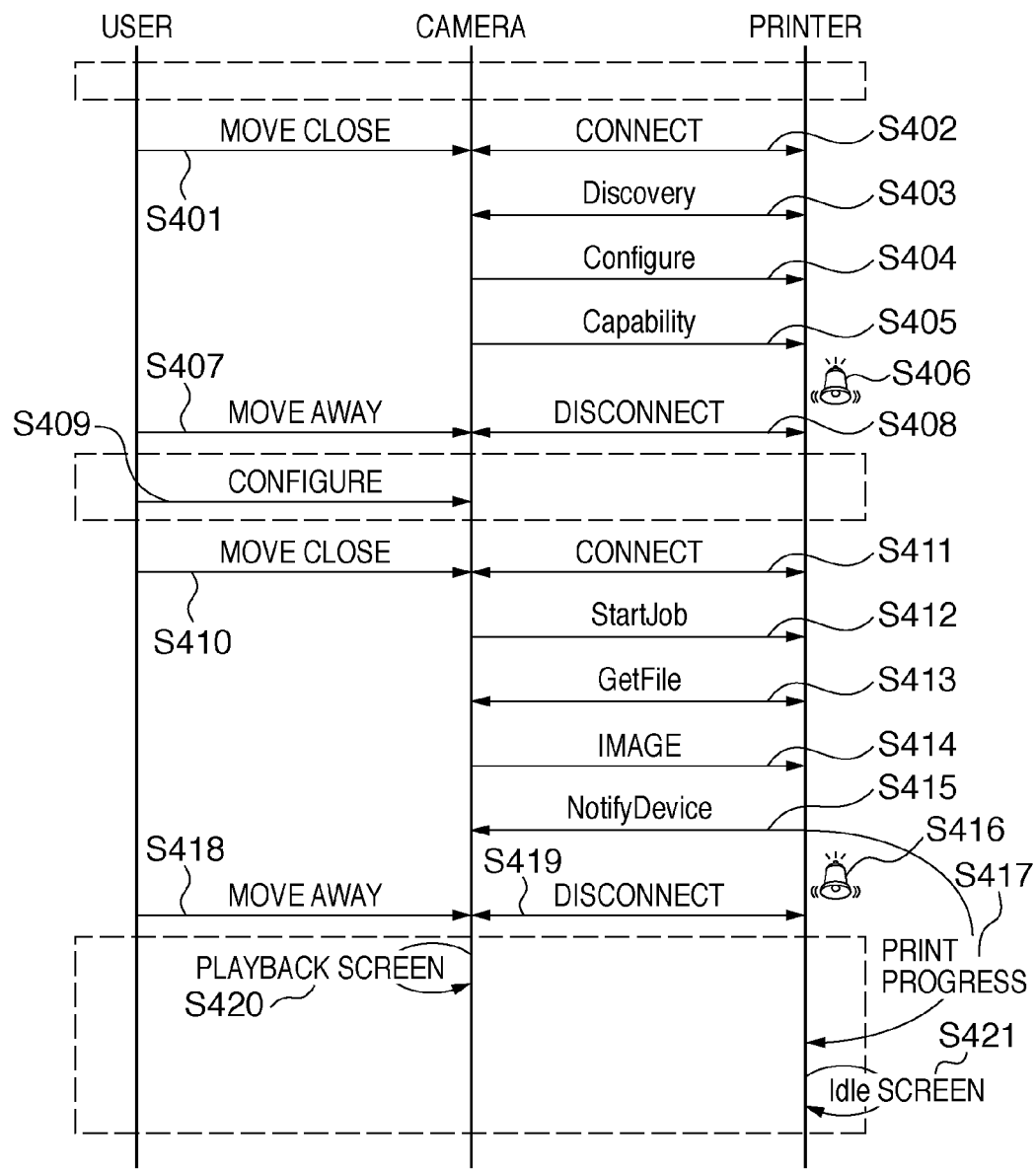
FIG. 4 is a sequence chart showing an outline of a direct print process between the digital camera and the printer according to the first embodiment.

An outline of a direct print process performed between the digital camera 100 and the printer 201 by causing the user to operate the digital camera 100 will be described next. FIG. 4 is a sequence chart showing an outline of a direct print process between the digital camera 100 and the printer 201.

The direct print process to be explained below is a process of causing the printer 201 to output image data stored in the digital camera 100. This is merely an example, and configurations for the image to be output may be done at any stage other than print parameter configuration to be described later. For example after making configurations for the image to be output in advance, the direct print process to be described below may be executed. The image to be output by the printer 201 may be image data transmitted from another information device such as a PC, and the digital camera 100 may be a configuring apparatus for only configuring the print parameters of the printer 201 by the direct print process.

As shown in FIG. 4, in step S401, the user moves the digital camera 100 close to the printer 201 to perform a print (image formation) process by direct printing. When the distance between the digital camera 100 and the printer 201 shortens up to the communication range 300, they establish close proximity wireless communication in step S402.

When the close proximity wireless communication is established in step S402, the digital camera 100 and the printer 201 perform a PictBridge authentication process (S403 to S405). First, in step S403, the digital camera 100 and the printer 201 perform a DPS_Discovery process to confirm whether each device is compliant to PictBridge.

In step S404, the digital camera 100 and the printer 201 perform a DPS_ConfigurePrintService process. With this process, the digital camera 100 acquires the DPS version, vender name, and product name of the printer 201.

In step S405, the digital camera 100 and the printer 201 perform a DPS_GetCapability process. With this process, the digital camera 100 acquires information about the printing capabilities of the printer 201, including the paper sizes and layouts supported by the printer 201, that is, information associated with the output configurations (print parameters) of the printer 201 to be made on the digital camera 100.

In the above-described PictBridge authentication process, the digital camera 100 and the printer 201 may notify each other of ID information, that is, identification information and temporarily store, in the memory, the ID information of the partner of the close proximity wireless communication. Storing the ID information of the partner of close proximity wireless communication allows the digital camera 100 and the printer 201 which have executed close proximity wireless communication once to resume the procedure from the step next to the PictBridge authentication process.

Assume that two digital cameras exist, and one of them has made a communication connection to the printer 201 by close proximity wireless communication once. When the digital camera has established close proximity wireless communication with the printer 201 again, the procedure is resumed from the step next to the PictBridge authentication process. Conversely, if the other digital camera is connected to the printer 201 by close proximity wireless communication, the procedure starts from the PictBridge authentication process. That is, managing communication partners using IDs also enables parallel management of processes from a plurality of digital cameras.

After the DPS_GetCapability process in step S405, the printer 201 performs a disconnection notification process in step S406. The disconnection notification process is executed to notify the user of the completion of data transmission/reception between the digital camera 100 and the printer 201. More specifically, the notification unit 218 generates, for example, alarm sound to notify the user. With the disconnection notification process, the user knows that data transmission/reception between the digital camera 100 and the printer 201 has completed, and communication connection by close proximity wireless communication can be disconnected.

The user knows by the notification in step S406 that the close proximity wireless communication is disconnectable, and moves the digital camera 100 away from the printer 201 in step S407 by, for example, moving the digital camera 100 away from the printer 201. When the distance between the digital camera 100 and the printer 201 increases up to the communication range 300 or more, they disconnect the close proximity wireless communication in step S408.

In step S409, the operation unit 70 of the digital camera 100 receives print parameter configurations from the user. A user interface for receiving the print parameter configurations will be described later in detail. In step S409, the close proximity wireless communication between the digital camera 100 and the printer 201 need not be kept established. It is therefore possible to configure the print parameters without any restriction on the communication range of close proximity wireless communication. In step S409, image data to be printed by the printer 201 is selected, on the operation unit 70, from image data stored in the memory 30 or the external storage medium 93 in parallel to print parameter configuration. Note that the print parameters of the printer 201 in the print process can be configured based on the information acquired by the DPS_GetCapability process in step S405. Examples of the print parameters of the printer 201 are the paper type, layout designation, and number of sheets to be printed.

After the configuration via the operation unit 70 in step S409, the user brings the digital camera 100 near to the printer 201 in step S410. When the distance between the digital camera 100 and the printer 201 shortens to the communication range 300 or less, they establish close proximity wireless communication again in step S411.

When the close proximity wireless communication is established again in step S411, the digital camera 100 and the printer 201 perform a PictBridge print start process (S412 to S415). First, in step S412, the digital camera 100 and the printer 201 perform a DPS_StartJob process so that the digital camera 100 transmits the print parameters configured in step S409 and print-designated image information to the printer 201.

In step S413, the digital camera 100 and the printer 201 perform a DPS_GetFileInfo process. In this process, the printer 201 acquires the file information of the designated image from the digital camera 100 based on the print-designated image information and acquired in step S412. Next, in step S414, the digital camera 100 and the printer 201 perform a DPS_GetFile process. In this process, the printer 201 acquires the image data to be printed from the digital camera 100 based on the image information acquired in step S413.

In step S415, the digital camera 100 and the printer 201 perform a DPS_NotifyDeviceStatus process. In this process, the printer 201 notifies the digital camera 100 of its status information such as printing progress. The digital camera 100 may display, on, for example, the display unit 54, the status information sent from the printer 201. In this case, the user can confirm on the display unit 54 whether the printer 201 is correctly printing.

After the DPS_NotifyDeviceStatus process in step S415, the printer 201 performs the disconnection notification process in step S416. Then, in step S417, the printer 201 causes the print engine 202 to perform printing based on the image data acquired from the digital camera 100.

The user knows by the notification in step S416 that the close proximity wireless communication is disconnectable, and moves the digital camera 100 away from the printer 201 in step S418. When the distance between the digital camera 100 and the printer 201 increases up to the communication range 300 or more, they disconnect the close proximity wireless communication in step S419.

Upon detecting, in step S419, the disconnection of communication established with respect to the printer 201, the digital camera 100 returns the display unit 54 to a normal display state (e.g., playback screen) before direct printing in step S420 and terminates the process. When printing in step S417 has terminated, the printer 201 returns the display unit 203 to a normal state (e.g., Idle screen) before direct printing in step S421 and terminates the process.

Figure 5:
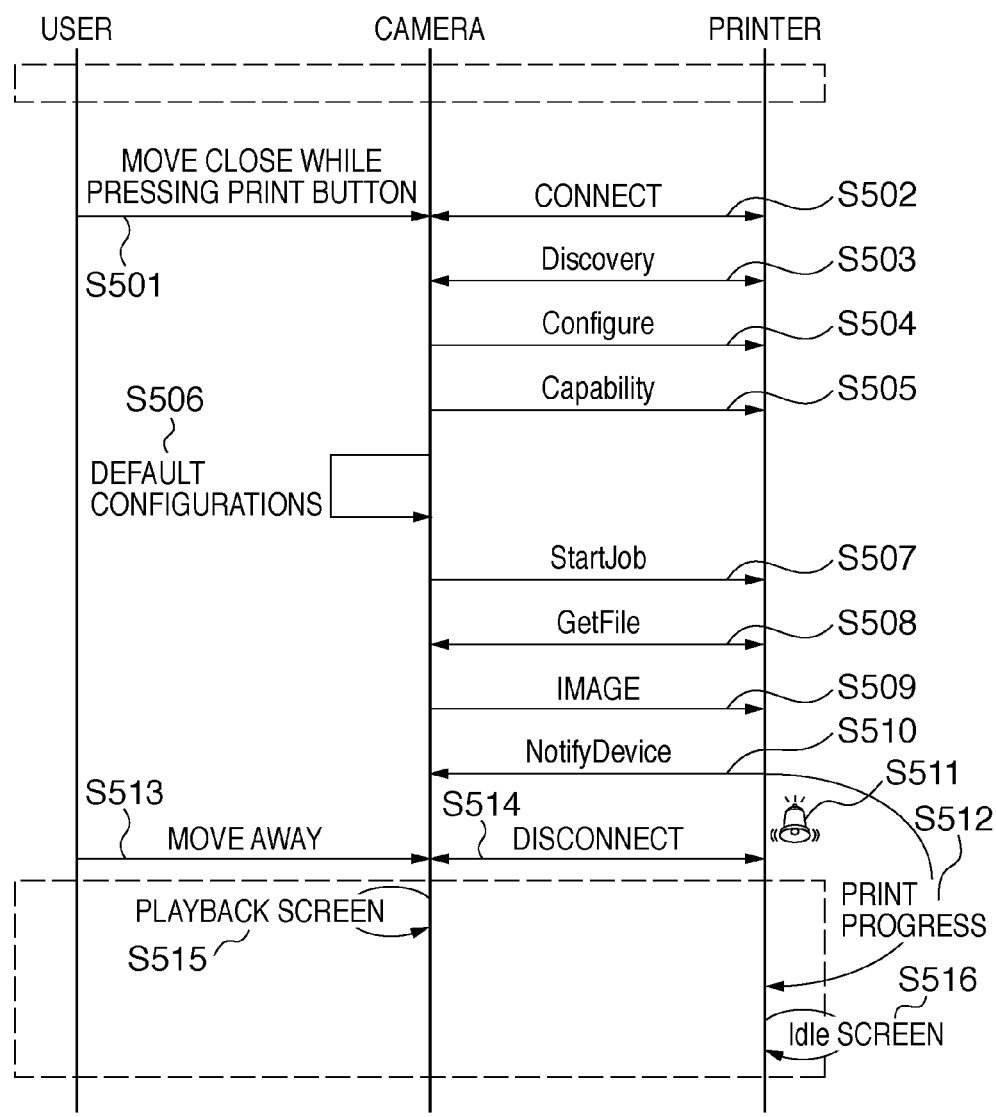
FIG. 5 is a sequence chart showing an outline of a direct print process when a user has moved the digital camera close to the printer while keeping a print button pressed.

A process that is the same as the above described direct print process and is executed when the user has moved the digital camera 100 close to the printer 201 while continuously pressing an instruction button (print button) to print based on predetermined default configurations of the digital camera 100. FIG. 5 is a sequence chart showing an outline of the direct print process when the user has moved the digital camera 100 closet to the printer while keeping the print button pressed. Note that the predetermined default configurations cause the printer to print on an L-size paper sheet based on latest image data stored in the memory 30 or the external storage medium 93. The same step numbers as in the above-described direct print process represent the same process contents in FIG. 5, and a description thereof will not be repeated.

As shown in FIG. 5, in step S501, the user operates the operation unit 70 of the digital camera 100 and moves the digital camera 100 close to the printer 201 while keeping the print button pressed. In steps S502 to S505, when the distance between the digital camera 100 and the printer 201 shortens up to the communication range 300, they establish close proximity wireless communication and perform the same processes as in steps S402 to S405 described above.

After the DPS_GetCapability process in step S505, the digital camera 100 configures the print parameters in accordance with the above-described default configurations based on the instruction state of the pressed print button in step S506. In steps S507 to S516, the digital camera 100 and the printer 201 perform the same processes as in steps S412 to S421 described above. That is, the printer 201 executes printing based on the predetermined default configurations so that the user's configuration operations such as image selection and paper configuration can be omitted.

Figure 6:
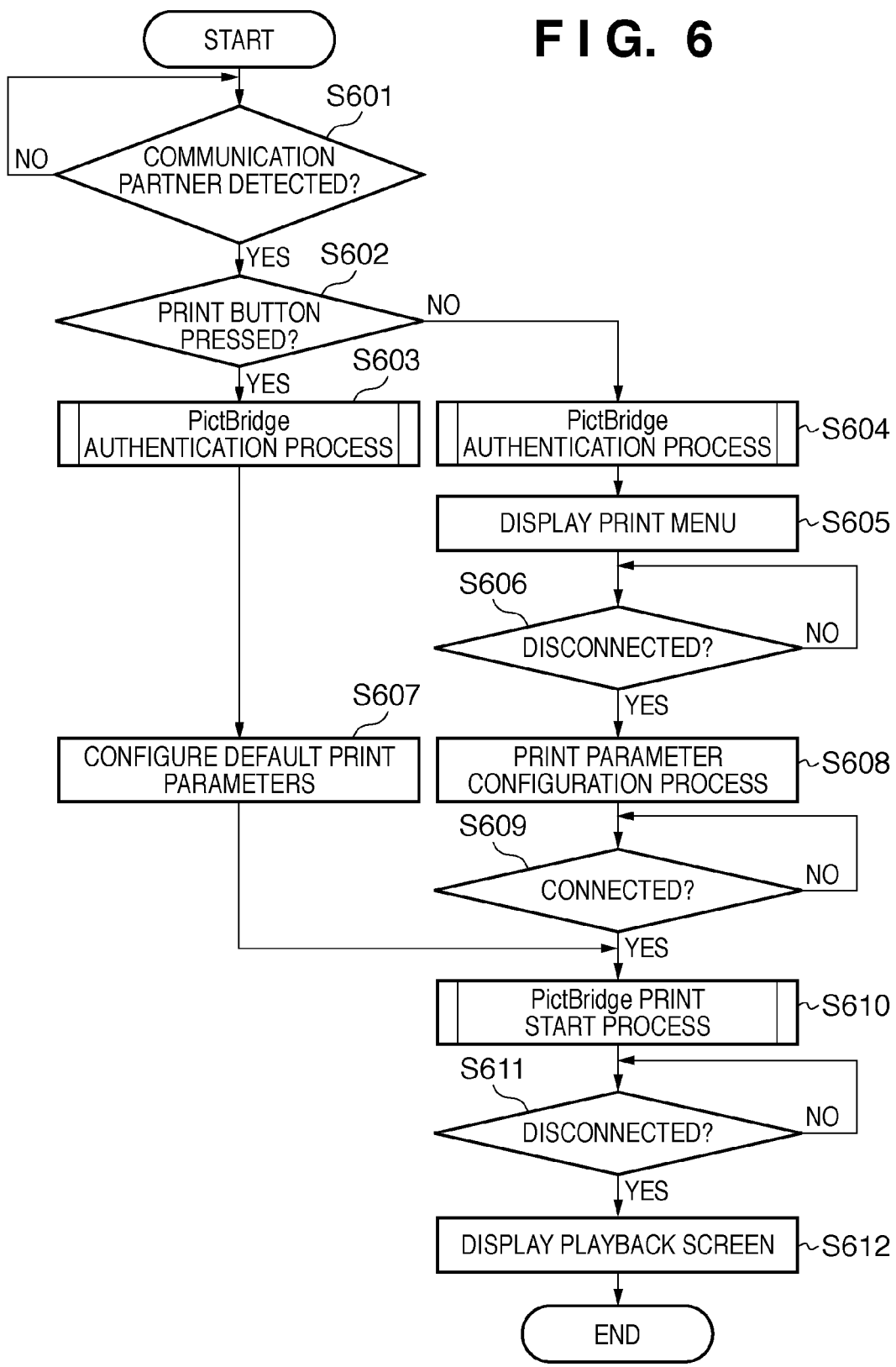
FIG. 6 is a flowchart illustrating the process contents of the digital camera according to the first embodiment.
Figure 7:
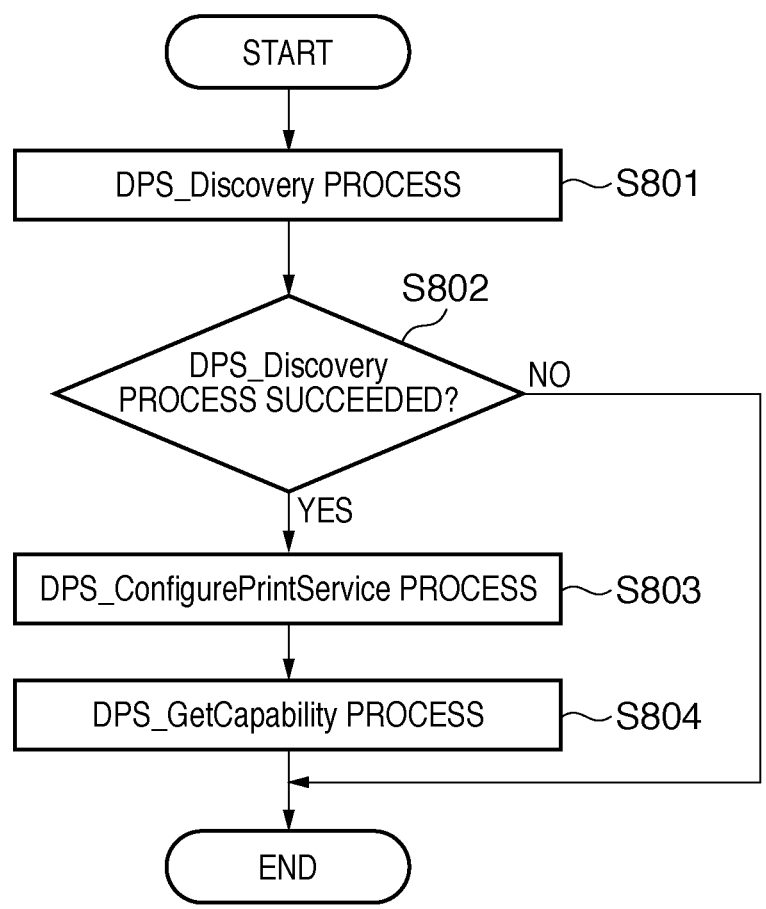
FIG. 7 is a flowchart illustrating the contents of a PictBridge authentication process.
Figure 8A:
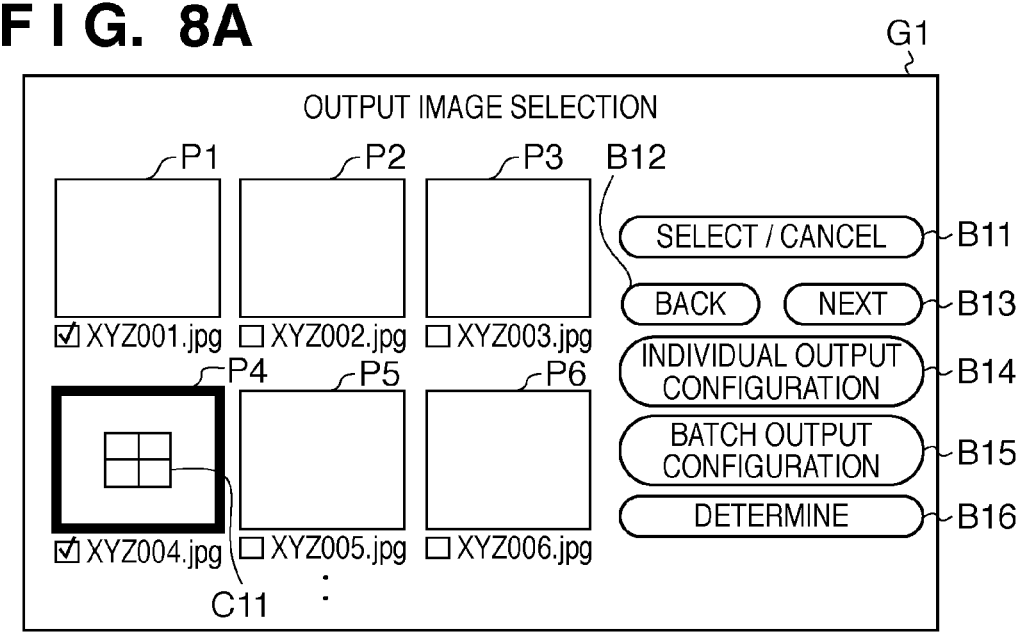
FIG. 8A is a schematic diagram illustrating an output image configuration screen.
Figure 8B:
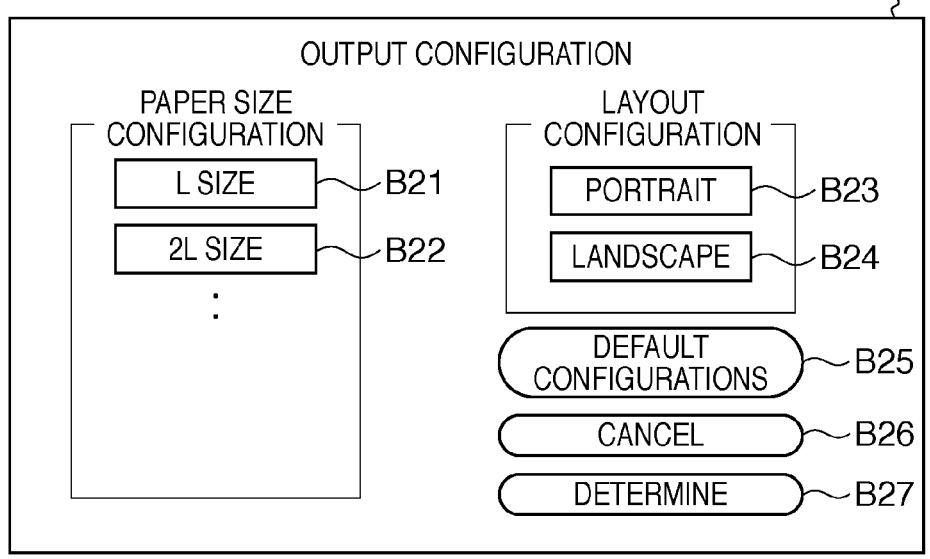
FIG. 8B is a schematic diagram illustrating a print parameter configuration screen.
Figure 8C:
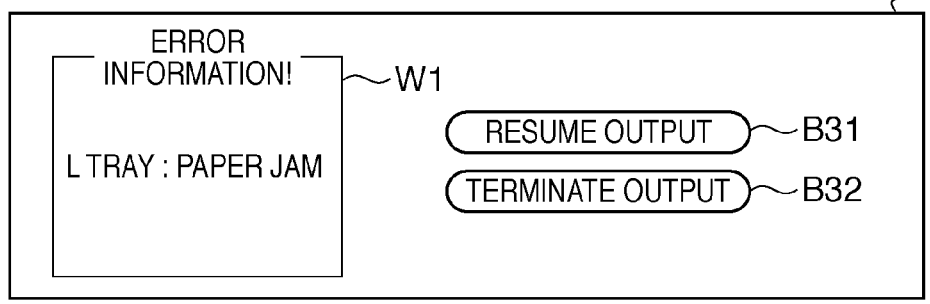
FIG. 8C is a schematic diagram illustrating a print resumption/interruption configuration screen.
Figure 9:
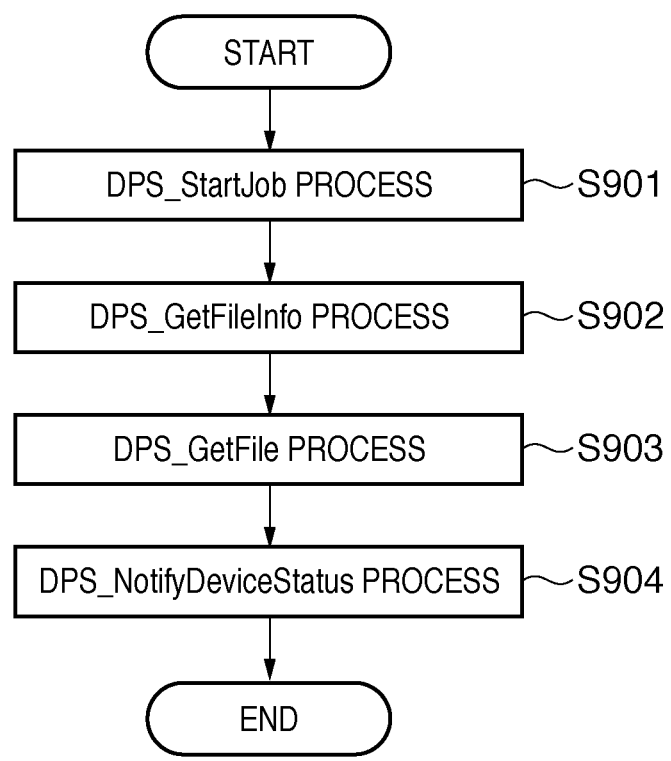
FIG. 9 is a flowchart illustrating the contents of a PictBridge print start process.

A process executed under the control of the central control circuit 50 of the digital camera 100 in the above-described direct print process will be explained next in detail with reference to FIGS. 6 to 9. FIG. 6 is a flowchart illustrating the process contents of the digital camera 100 according to this embodiment. FIG. 7 is a flowchart illustrating the contents of the PictBridge authentication process. FIG. 8A is a schematic diagram illustrating an output image configuration screen. FIG. 8B is a schematic diagram illustrating a print parameter configuration screen. FIG. 9 is a flowchart illustrating the contents of the PictBridge print start process.

As shown in FIG. 6, when the process starts, the central control circuit 50 determines in step S601 based on the signal output from the communication unit 110 whether a communication partner (printer 201) with which communication has been established by close proximity wireless communication is detected, that is, the presence/absence of communication connection. The determination in step S601 is repeated until a partner of communication established by close proximity wireless communication is detected.

Upon detecting a partner of communication established by close proximity wireless communication in step S601, the central control circuit 50 determines the presence/absence of press of the print button on the operation unit 70 in step S602.

A case will be explained first, in which the central control circuit 50 determines in step S602 that the print button is not pressed. Upon determining in step S602 that the print button is not pressed, the central control circuit 50 executes the PictBridge authentication process in step S604. The PictBridge authentication process is performed by the digital camera 100 in steps S403 to S405 described with reference to FIG. 4.

As shown in FIG. 7, when the PictBridge authentication process starts, the central control circuit 50 performs the DPS_Discovery process in step S801 to confirm whether the communication partner supports PictBridge. In step S802, the central control circuit 50 determines whether the DPS_Discovery process has succeeded, that is, whether the communication partner supports PictBridge.

Upon determining in step S802 that the process has succeeded, the central control circuit 50 performs the DPS_ConfigurePrintService process and the DPS_GetCapability process in steps S803 and S804 and then terminates the PictBridge authentication process. Upon determining in step S802 that the process has failed, the central control circuit 50 terminates the PictBridge authentication process at this point of time.

Referring back to FIG. 6, steps from S604 will be described. When the PictBridge authentication process has terminated in step S604, the central control circuit 50 displays a print menu on the display unit 54 in step S605. The print menu is used to configure the paper size, print layout, and the like. At this time, the printer 201 performs the notification in step S406 described above. The user knows that the close proximity wireless communication is disconnectable, and moves the digital camera 100 away from the printer 201. The central control circuit 50 determines in step S606 based on the signal output from the communication unit 110 whether the close proximity wireless communication is disconnected, and waits until disconnection of the close proximity wireless communication while continuously displaying the print menu.

When the close proximity wireless communication is disconnected in step S606, the central control circuit 50 performs a print parameter configuration process in step S608. In the print parameter configuration process of step S608, the central control circuit 50 reads out program data associated with a user interface from the memory 52 and sequentially executes them, thereby displaying a configuration screen on the image display unit 28 and receiving user instructions from the operation unit 70.

FIGS. 8A and 8B show detailed examples of the print menu screen. A screen G1 as shown in FIG. 8A to select an image to be output by the printer 201 is displayed on the image display unit 28. In the screen G1, images P1 to P6 are image data stored in the external storage medium 93 or the like. A button B11 gives the instruction to select an image designated by a cursor C11 indicated by a bold line or cancel the selection. Buttons B12 and B13 instruct to move the cursor C11. A button B14 gives the instruction to configure the print parameters of each image designated by the cursor C11. A button B15 gives the instruction to use the same print parameter configurations for all images. A button B16 gives the instruction to determine the configurations. During display of the screen G1, the central control circuit 50 receives instructions from the buttons B11 to B16 according to user operations via the operation unit 70, thereby configuring images to be output by the printer 201.

Upon receiving the instruction of the button B14 or B15, the central control circuit 50 displays, on the image display unit 28, a screen G2 shown in FIG. 8B to configure the print parameters. The screen G2 to configure the print parameters is formed based on information about the print parameters acquired from the printer 201 by the DPS_GetCapability process (S804). To configure, for example, the L or 2L paper size and portrait or landscape output layout as print parameters, buttons B21 to B24 are displayed on the image display unit 28. To configure only the L or 2L paper size as a print parameter, only the buttons B21 and B22 are displayed on the image display unit 28.

In the screen G2, the buttons B21 and B22 instruct the paper size or paper type in the print parameters. The buttons B23 and B24 instruct the output layout in the print parameters. A button B25 designates the default configurations preset in, for example, the memory 52 as the print parameters. A button B26 gives the instruction to cancel the print parameters configured in the screen G2. A button B27 gives the instruction to determine the print parameters configured in the screen G2. During display of the screen G2, the central control circuit 50 receives instructions from the buttons B21 to B27 according to user operations via the operation unit 70, thereby configuring the print parameters of the printer 201. Note that when the screen G2 is displayed using the button B14, the print parameters of the designated image are configured. When the screen G2 is being displayed on the image display unit 28, the central control circuit 50 may receive the number of output sheets from the number keys of the operation unit 70.

The digital camera 100 configures the images to be printed and their print parameters such as the number of sheets to be printed, paper type, and layout configuration as in step S409 described above via the user interface using the screens G1 and G2. Note that when configuring only the print parameters, the central control circuit 50 displays only the screen G2 on the image display unit 28 based on information about the print parameters acquired by the DPS_GetCapability process, and receives user's configuration instructions via the operation unit 70.

In this embodiment, the print menu is displayed at the end of the PictBridge authentication process. However, the timing of display is not limited to this. For example, a message "Separate devices away from each other" may be displayed at the point of time of step S605 to prompt the user to temporarily disconnect the communication. In this case, the print menu is displayed upon detecting disconnection of communication in step S606.

This procedure has the following advantage. If the selection screen is displayed on the digital camera placed near the printer, the user may attempt to operate the print menu screen without separating the devices away from to each other. To prevent this, when communication is continuing, the digital camera 100 displays a screen to prompt the user to disconnect. Only when the communication is disconnected, the digital camera 100 displays the print menu. This allows the user to operate the digital camera 100 away from the printer 201.

After the configuration in step S608, the user moves the digital camera 100 close to the printer 201 as in step S410 described above. The central control circuit 50 determines in step S609 based on the signal output from the communication unit 110 whether the digital camera 100 and the printer 201 are connected again by close proximity wireless communication. Note that whether the devices are connected again is determined by checking, based on the above-described ID information sent in the close proximity wireless communication, whether the connected device is the same as the device with which communication was established in step S604 by close proximity wireless communication. If the devices are connected again, the process advances to the next step without performing the PictBridge authentication process again. More specifically, the PictBridge session of the device with which communication was established in step S604 by close proximity wireless communication is maintained even when the close proximity wireless communication was disconnected in step S606. In step S609, the central control circuit 50 waits until it determines that the devices are connected again.

If the printer 201 is connected again by close proximity wireless communication in step S609, the central control circuit 50 performs the PictBridge print start process in step S610. Note that the PictBridge print start process is performed by the digital camera 100 in steps S412 to S415 described with reference to FIG. 4.

As shown in FIG. 9, when the PictBridge print start process starts, the central control circuit 50 performs, in step S901, the DPS_StartJob process of transmitting, to the printer 201, the print parameters configured and the output-designated image information in step S608. In step S902, the central control circuit 50 performs the DPS_GetFileInfo process of transmitting image information in response to the request from the printer 201.

In step S903, the central control circuit 50 performs the DPS_GetFile process of transmitting image data in response to the request from the printer 201. In step S904, the central control circuit 50 performs the DPS_NotifyDeviceStatus process of receiving status information sent from the printer 201, and terminates the PictBridge print start process. Note that the central control circuit 50 may display the received status information on, e.g., the display unit 54 in step S904.

Referring back to FIG. 6, steps from S610 will be described. When the PictBridge print start process has terminated in step S610, the printer 201 performs the notification in step S416 described above, and the user knows that the close proximity wireless communication is disconnectable. The user knows that the close proximity wireless communication is disconnectable, and then moves the digital camera 100 away from the printer 201. The central control circuit 50 determines in step S611 based on the signal output from the communication unit 110 whether the close proximity wireless communication is disconnected, and waits until disconnection of the close proximity wireless communication.

If the close proximity wireless communication is disconnected in step S611, the central control circuit 50 displays a playback screen on the display unit 54 in step S612, and terminates the direct print process.

A case will be explained next, in which the central control circuit 50 determines in step S602 that the print button is pressed. Upon determining in step S602 that the print button is pressed, the central control circuit 50 executes, in step S603, the PictBridge authentication process as in step S604.

Next, in step S607, the central control circuit 50 performs a default print parameter configuration process of reading out the default configurations preset in, for example, the memory 52 and configuring them as the print parameters. All the print parameters configured in step S607 are default and may include a configuration to print images currently displayed on the display unit 54 on one L-size paper sheet, in addition to the default configurations described with reference to FIG. 5. The central control circuit 50 then performs the processes in step S610 to S612 and terminates the direct print process.

Figure 10:
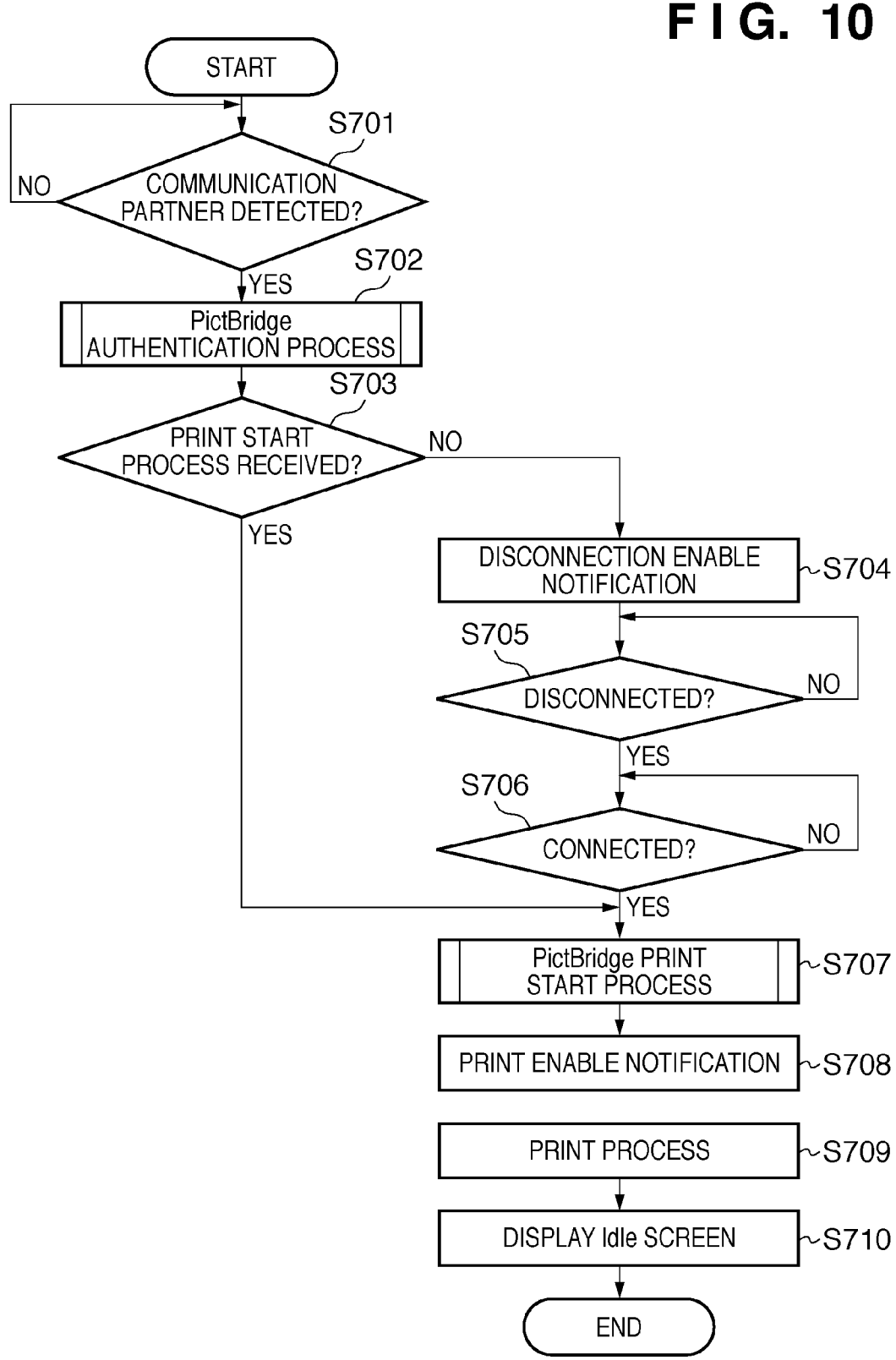
FIG. 10 is a flowchart illustrating the process contents of the printer according to the first embodiment.

A process executed under the control of the central controller 207 of the printer 201 in the above-described direct print process will be explained next in detail with reference to FIG. 10. FIG. 10 is a flowchart illustrating the process contents of the printer 201 according to this embodiment.

As shown in FIG. 10, the central controller 207 determines in step S701 based on the signal output from the communication unit 216 whether a communication partner (digital camera 100) with which communication has been established by close proximity wireless communication is detected, that is, the presence/absence of communication connection. The determination in step S701 is repeated until a partner of communication established by close proximity wireless communication is detected.

Upon detecting a partner of communication established by close proximity wireless communication in step S701, the central controller 207 executes the PictBridge authentication process in step S702. The PictBridge authentication process is performed by the printer 201 in steps S403 to S405 described with reference to FIG. 4. The steps executed by the central controller 207 in the PictBridge authentication process are the same as those of the digital camera 100 described above and will therefore be described with reference to FIG. 7.

As shown in FIG. 7, when the PictBridge authentication process starts, the central controller 207 performs the DPS_Discovery process in step S801 to confirm whether the communication partner supports PictBridge. In step S802, the central controller 207 determines whether the DPS_Discovery process has succeeded, that is, whether the communication partner supports PictBridge.

Upon determining in step S802 that the process has succeeded, the central controller 207 performs the DPS_ConfigurePrintService process and the DPS_GetCapability process in steps S803 and S804 and then terminates the PictBridge authentication process. Upon determining in step S802 that the process has failed, the central controller 207 terminates the PictBridge authentication process at this point of time.

Referring back to FIG. 10, steps from S702 will be described. When the PictBridge authentication process has terminated in step S702, the central controller 207 determines in step S703 whether it has received data associated with the PictBridge print start process from the digital camera 100 as the communication partner. More specifically, the central controller 207 determines whether it has received data transmitted from the digital camera 100 in the DPS_StartJob process at the beginning of the PictBridge print start process. Upon determining in step S703 that the data associated with the PictBridge print start process has been received, the central controller 207 advances the process to step S707 to be described later.

Upon determining in step S703 that the data associated with the PictBridge print start process has not been received, the central controller 207 performs the disconnection notification process of causing the notification unit 218 to generate alarm sound in step S704. The user knows by the notification in step S704 that the close proximity wireless communication is disconnectable, and moves the digital camera 100 away from the printer 201. The central controller 207 determines in step S706 based on the signal output from the communication unit 216 whether the close proximity wireless communication is disconnected, and waits until disconnection of the close proximity wireless communication.

The central controller 207 determines in step S706 based on the signal output from the communication unit 216 whether the digital camera 100 is connected again by close proximity wireless communication, and waits until reconnection. More specifically, the printer 201 stands by until the configuration in step S409 described above is done in the digital camera 100, and after the configuration, the digital camera 100 is moved close to the printer 201 and connected again. Note that the digital camera 100 and the printer 201 need not keep communication connection by close proximity wireless communication between steps S705 and S706. Hence, the digital camera 100 can make configurations without any restriction on the communication range of close proximity wireless communication between steps S705 and S706.

When the user has brought the digital camera 100 close to the printer 201 and established close proximity wireless communication between them again, the central controller 207 performs the PictBridge print start process in step S707. If each communication partner is managed by an ID, the central controller 207 determines, by referring to the ID of the digital camera 100, whether the communication partner is the digital camera 100 which disconnected the communication after the PictBridge authentication process. If so, the central controller 207 performs the PictBridge print start process. The PictBridge print start process is performed by the printer 201 in steps S412 to S415 described with reference to FIG. 4. The steps executed by the central controller 207 in the PictBridge print start process are the same as those of the digital camera 100 described above and will therefore be described with reference to FIG. 9.

As shown in FIG. 9, when the PictBridge print start process starts, the central controller 207 performs, in step S901, the DPS_StartJob process of receiving the print parameters and the output-designated image information which are transmitted from the digital camera 100. In step S902, the central controller 207 performs the DPS_GetFileInfo process of requesting image file information based on the output-designated image information received in step S901.

In step S903, the central controller 207 performs the DPS_GetFile process of requesting image data designated to be printed using the print parameters received in step S901. In step S904, the central controller 207 performs the DPS_No-tifyDeviceStatus process of transmitting status information such as printing progress based on the received data, and terminates the PictBridge print start process.

Referring back to FIG. 10, steps from S707 will be described. When the PictBridge print start process has terminated in step S707, the central controller 207 performs the disconnection notification process in step S708.

Next, in step S709, the central controller 207 executes the print process of causing the print engine 202 to print on the paper sheet based on the data acquired from the digital camera 100. When the print process in step S709 has terminated, the central controller 207 displays the Idle screen on the display unit 203 in step S710, and terminates the direct print process.

As described above, if the user moves the digital camera 100 close to the printer 201 without pressing the print button of the operation unit 70, he/she can configure the print parameters after the PictBridge authentication process while keeping the digital camera 100 away from the printer 201. When the user brings the digital camera 100 close to the printer 201 again after the configuration, the printer 201 can output the configured images (form (print) the images on paper sheets). That is, the user can perform, on the digital camera 100, the print parameter configuration operation for the printer 201 without maintaining the communication established state by close proximity wireless communication. It is therefore possible to configure the print parameters on the digital camera 100 without any restriction on the communication range of close proximity wireless communication and improve the operability of the user.

If the user moves the digital camera 100 close to the printer 201 while pressing the print button of the operation unit 70, it is unnecessary to select images to be printed or configure the printer 201. The printer 201 can perform printing by one close proximity wireless communication.

Second Embodiment

In the second embodiment, a process executed when a print error such as paper jam or run out of ink has occurred during execution of the print process (image output) of the above-described direct print process will be described with reference to FIGS. 11 to 13 and 8C. The arrangements of a digital camera 100 and a printer 201 are the same as in the first embodiment, and a description thereof will not be repeated. As for the steps executed by the digital camera 100 and the printer 201 of the second embodiment, the same step numbers as in the first embodiment represent the same process contents, and a description thereof will not be repeated.

Figure 11:
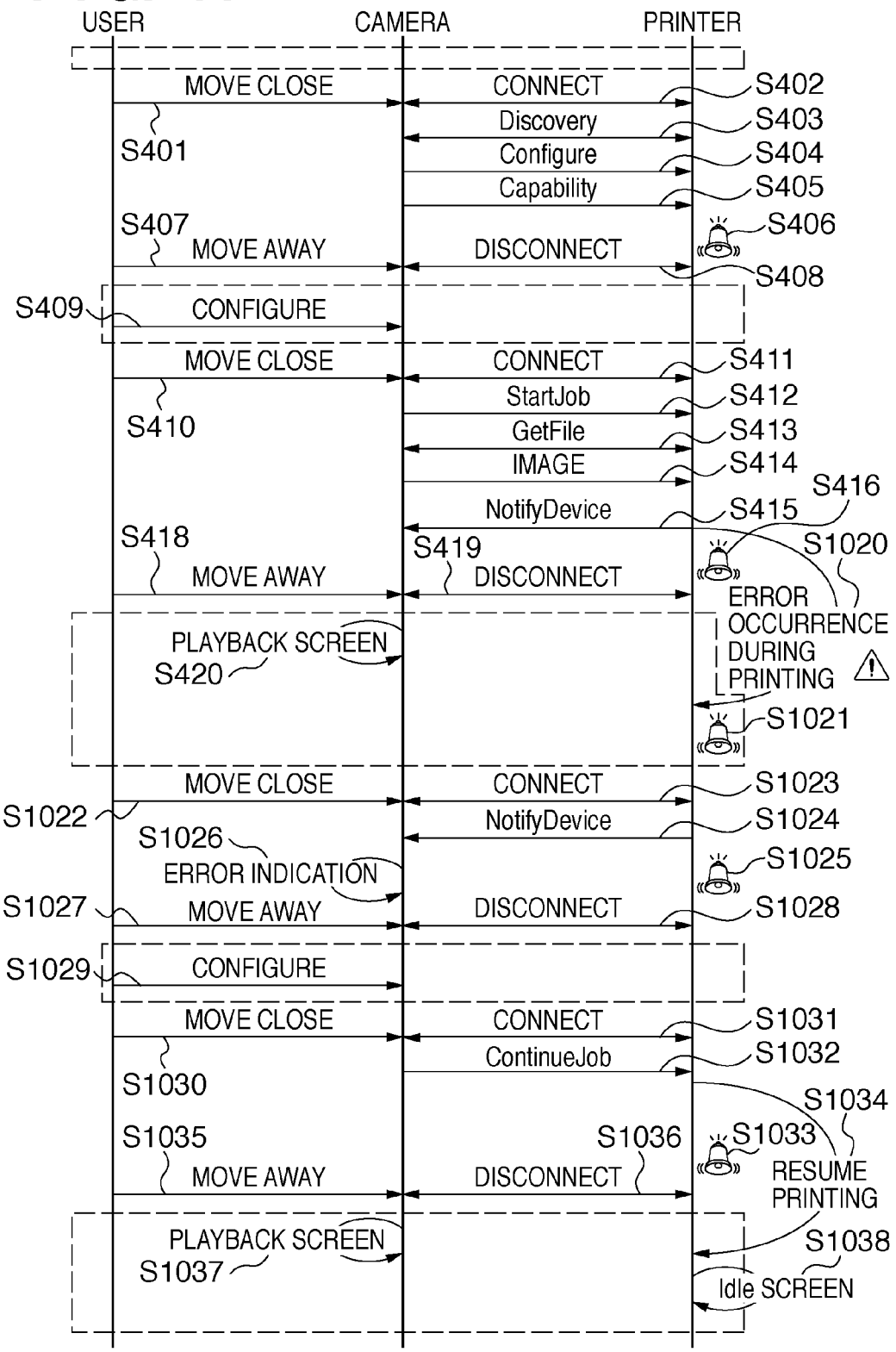
FIG. 11 is a sequence chart showing an outline of a process according to the second embodiment.
Figure 12:
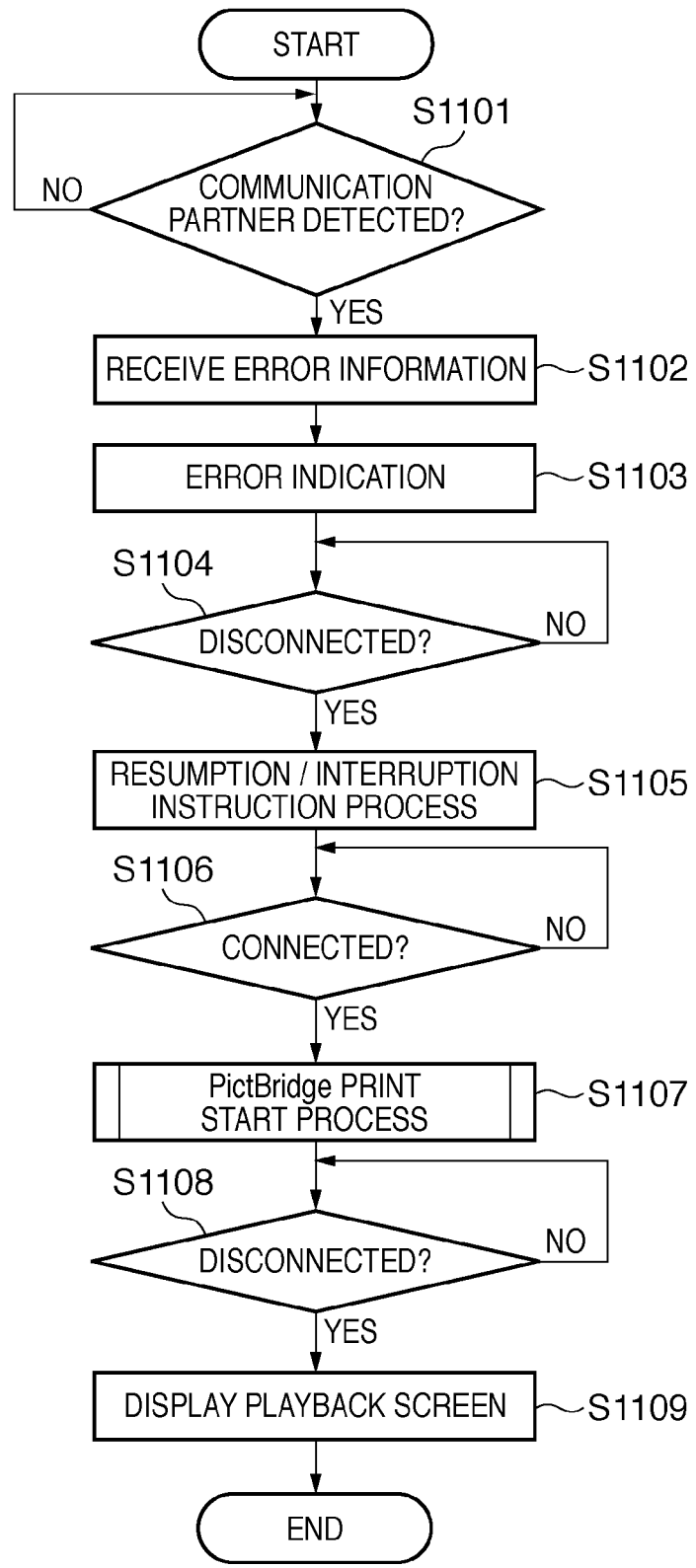
FIG. 12 is a flowchart illustrating the process contents of a digital camera according to the second embodiment.
Figure 14:
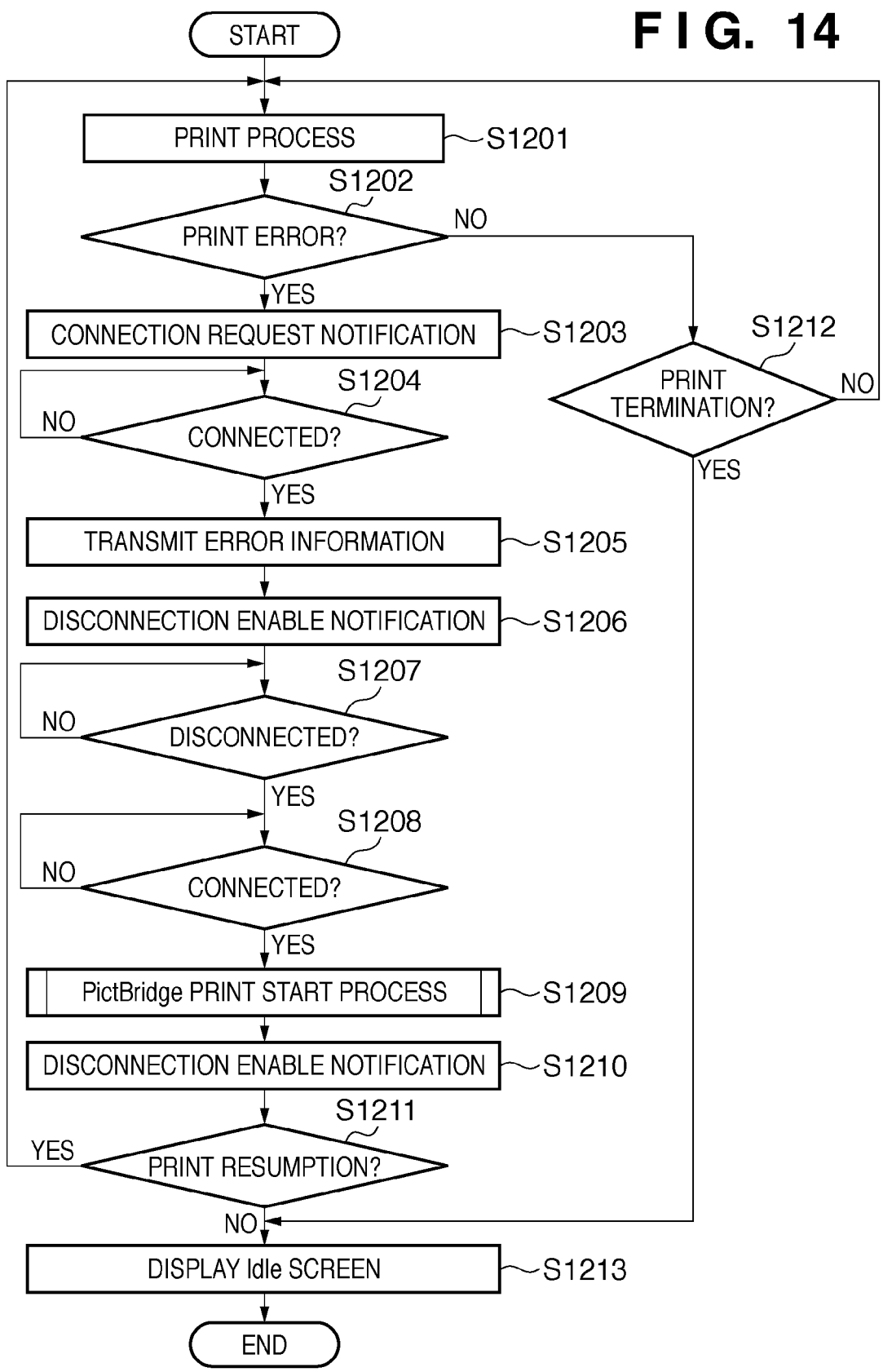
FIG. 14 is a flowchart illustrating the process contents of a printer according to the second embodiment.

FIG. 11 is a sequence chart showing an outline of a process according to the second embodiment the digital camera 100 and the printer 201 perform when the user operates the digital camera 100. FIG. 12 is a flowchart illustrating the process contents of the digital camera 100 according to the second embodiment. FIG. 13 is a flowchart illustrating the contents of a PictBridge print resumption process. FIG. 14 is a flowchart illustrating the process contents of the printer 201 according to the second embodiment. FIG. 8C is a schematic diagram illustrating a print resumption/interruption configuration screen.

As shown in FIG. 11, the process up to step S1020 where an error occurs during printing is the same as in the first embodiment. When an error has occurred in a print engine 202 in step S1020, the printer 201 interrupts the print process. In step S1021, the printer 201 performs a connection request notification process of notifying the user of error occurrence in the print engine 202 and prompting him/her to connect the digital camera 100. The connection request notification process is executed to notify the user of error occurrence in the print engine 202 and prompt him/her to move the digital camera 100 close to the printer 201 and reconnect them so that close proximity wireless communication resumes. In the connection request notification process, for example, a notification unit 218 notifies the user by generating alarm sound.

The user knows the close proximity wireless communication resumption request by the notification in step S1021 and brings the digital camera 100 near to the printer 201 in step S1022. When the distance between the digital camera 100 and the printer 201 shortens to a communication range 300 or less, they establish close proximity wireless communication again in step S1023.

When the close proximity wireless communication is established again in step S1023, the digital camera 100 and the printer 201 perform a DPS_NotifyDeviceStatus process in step S1024. In this process, the printer 201 sends, to the digital camera 100, error information including status information representing the contents of the print error. Note that the error information may include information concerning print resumption/interruption configuration in the printer 201.

After the DPS_NotifyDeviceStatus process, the printer 201 performs a disconnection notification process in step S1025. In step S1026, based on the error information received in step S1024, the digital camera 100 displays, on a display unit 54, an error indication (e.g., paper jam) by an image or text representing occurrence of the print error in the printer 201.

The user knows by the notification in step S1025 that the close proximity wireless communication is disconnectable, and moves the digital camera 100 away from the printer 201 in step S1027. When the distance between the digital camera 100 and the printer 201 increases up to the communication range 300 or more, they disconnect the close proximity wireless communication in step S1028.

The user can know of the occurrence of, for example, paper jam in the printer 201 by the error indication in step S1026. He/she removes the jammed paper sheet and then configures print resumption in step S1029 by operating an operation unit 70 of the digital camera 100. A user interface for receiving the print resumption configuration will be described in detail later. The configuration in step S1029 is done while keeping the digital camera 100 away from the printer 201. Note that the configuration content in step S1029 of this embodiment is print resumption but may be print interruption. In case of print interruption, a DPS_AbortJob process of notifying the user of a print interruption instruction is executed instead of a DPS_ContinueJob process in step S1032 to be described later.

After the configuration via the operation unit 70 in step S1029, the user brings the digital camera 100 near the printer 201 in step S1030. When the distance between the digital camera 100 and the printer 201 shortens to the communication range of 300 or less, they establish close proximity wireless communication again in step S1031.

When the close proximity wireless communication is established again in step S1031, the digital camera 100 and the printer 201 perform a DPS_ContinueJob process of causing the digital camera 100 to notify the printer 201 of a print resumption instruction in step S1032.

After the DPS_ContinueJob process in step S1032, the printer 201 performs the disconnection notification process in step S1033. In step S1034, the printer 201 resumes the print process interrupted by the error in accordance with the print resumption instruction received in step S1032.

The user knows by the notification in step S1033 that the close proximity wireless communication is disconnectable, and moves the digital camera 100 away from the printer 201 in step S1035. When the distance between the digital camera 100 and the printer 201 increases up to the communication range 300 or more, they disconnect the close proximity wireless communication in step S1036.

Upon detecting, in step S1036, the disconnection of communication established with respect to the printer 201, the digital camera 100 returns the display unit 54 to a playback screen in step S1037 and terminates the process. When printing in step S1034 has terminated, the printer 201 returns a display unit 203 to an Idle screen before direct printing in step S1038 and terminates the process.

The process of the digital camera 100 according to the second embodiment will be described next. Note that the process (S601 to S612) of the digital camera 100 up to print error occurrence during printing by the printer 201 is the same as in the above-described first embodiment. The process of the digital camera 100 to be explained below is performed after step S612 under the control of a central control circuit 50 of the digital camera 100.

As shown in FIG. 12, when the process starts after step S612, the central control circuit 50 determines in step S1101 based on the signal output from a communication unit 110 whether the printer 201 is connected again by close proximity wireless communication. If an error has occurred during printing by the printer 201, the user moves the digital camera 100 close to the printer 201, as in steps S1020 to S1022 described above. Hence, the central control circuit 50 detects in step S1101 whether close proximity wireless communication has been established as the digital camera 100 has moved close to the printer 201 in step S1022.

If the printer 201 is connected again by close proximity wireless communication in step S1101, the central control circuit 50 receives error information from the printer 201 in step S1102. In step S1103, the central control circuit 50 displays an error indication on the display unit 54 based on the received error information. More specifically, a window W1 in a screen G3 as shown in FIG. 8C is displayed on the display unit 54. The window W1 displays status information included in the error information of the printer 201.

Since the printer 201 performs the notification in step S1025 described above, the user knows that the close proximity wireless communication is disconnectable, and moves the digital camera 100 away from the printer 201. The central control circuit 50 determines in step S1104 based on the signal output from the communication unit 110 whether the close proximity wireless communication is disconnected, and waits until disconnection of the close proximity wireless communication.

When the close proximity wireless communication is disconnected in step S1104, the central control circuit 50 performs, in step S1105, an instruction process of receiving an instruction input about print resumption/interruption configuration from the operation unit 70. In the instruction process of step S1105, the central control circuit 50 reads out program data associated with a user interface from a memory 52 and sequentially executes them, thereby displaying the screen G3 shown in FIG. 8C on an image display unit 28 and receiving user instructions from the operation unit 70. In the screen G3, a button B31 instructs print resumption. A button B32 instructs print interruption (termination). During display of the screen G3, the central control circuit 50 receives instructions from the buttons B31 and B32 according to user operations via the operation unit 70, thereby configuring print resumption/interruption.

After the configuration by the instruction process in step S1105, the user brings the digital camera 100 near the printer 201 as in step S1030 described above. The central control circuit 50 determines in step S1106 based on the signal output from the communication unit 110 whether the printer 201 is connected again by close proximity wireless communication.

If the printer 201 is connected again by close proximity wireless communication in step S1106, the central control circuit 50 performs a PictBridge print resumption process in step S1107.

As shown in FIG. 13, when the PictBridge print resumption process starts, the central control circuit 50 determines in step S1301 whether print resumption has been configured in step S1105. If print resumption has been configured, the central control circuit 50 performs the DPS_ContinueJob process of notifying the printer 201 of a print resumption instruction in step S1302, and terminates the process. If print interruption has been configured, the central control circuit 50 performs a DPS_AbortJob process of notifying the printer 201 of a print interruption instruction in step S1303, and terminates the process.

Referring back to FIG. 12, steps from S1107 will be described. When the PictBridge print resumption process has terminated in step S1107, the printer 201 performs the notification in step S1033 described above, and the user knows that the close proximity wireless communication is disconnectable. Upon knowing that the close proximity wireless communication is disconnectable, the user moves the digital camera 100 away from the printer 201. The central control circuit 50 determines in step S1108 based on the signal output from the communication unit 110 whether the close proximity wireless communication is disconnected, and waits until disconnection of the close proximity wireless communication.

When the close proximity wireless communication is disconnected in step S1108, the central control circuit 50 displays a playback screen on the display unit 54 in step S1109, and terminates the process.

The process of the printer 201 according to the second embodiment will be described next. Note that the process (S701 to S709) of the printer 201 up to print error occurrence during printing by the printer 201 is the same as in the above-described first embodiment. The process of the printer 201 to be explained below is performed after step S709 under the control of a central controller 207.

As shown in FIG. 14, when the process starts, the central controller 207 determines in step S1202 whether an print error has occurred during the print process by the print engine 202 in step S1201, thereby detecting a print error. If no print error is detected in step S1202, the central controller 207 determines in step S1212 whether the print process in step S1201 has terminated.

If the print process has not terminated in step S1212, the central controller 207 returns the process to step S1201. If the print process has terminated in step S1212, the central controller 207 advances the process to step S1213 to display the Idle screen on the display unit 203, and terminates the process.

Upon detecting a print error in step S1202, the central controller 207 performs the connection request notification process of, for example, causing the notification unit 218 to generate alarm sound in step S1203. The user knows by the notification in step S1203 that the close proximity wireless communication between the digital camera 100 and the printer 201 needs to resume, and brings the digital camera 100 near to the printer 201. The central controller 207 determines in step S1204 based on the signal output from a communication unit 216 whether the digital camera 100 is connected again by close proximity wireless communication, and waits until reconnection.

When the user has brought the digital camera 100 close to the printer 201 and established close proximity wireless communication again, the central controller 207 transmits error information representing the print error detected in step S1202 to the digital camera 100 in step S1205. After completion of error information transmission, the central controller 207 performs the disconnection notification process in step S1206.

The user knows by the notification in step S1206 that the close proximity wireless communication is disconnectable, and moves the digital camera 100 away from the printer 201. The central controller 207 determines in step S1207 based on the signal output from the communication unit 216 whether the close proximity wireless communication is disconnected, and waits until disconnection of the close proximity wireless communication.

The central controller 207 determines in step S1208 based on the signal output from the communication unit 216 whether the digital camera 100 is connected again by close proximity wireless communication, and waits until reconnection. More specifically, the printer 201 stands by until the configuration in step S1029 described above is done in the digital camera 100, and after the configuration, the digital camera 100 is moved close to the printer 201 and connected again. Note that the digital camera 100 and the printer 201 need not keep communication connection by close proximity wireless communication between steps S1207 and S1208. Hence, the digital camera 100 can make print resumption/interruption configuration without any restriction on the communication range of close proximity wireless communication between steps S1207 and S1208.

When the user has brought the digital camera 100 close to the printer 201 and established close proximity wireless communication between them again, the central controller 207 performs the PictBridge print resumption process in step S1209. The steps executed by the central controller 207 in the PictBridge print resumption process are the same as those of the digital camera 100 described above and will therefore be described with reference to FIG. 13.

As shown in FIG. 13, when the PictBridge print resumption process starts, the central controller 207 determines in step S1301 whether it has received a print resumption instruction from the digital camera 100. Upon receiving a print resumption instruction, the central controller 207 performs, in step S1302, the DPS_ContinueJob process of resuming the print process interrupted by the print error, and terminates the process. Upon receiving a print interruption instruction, the central controller 207 performs the DPS_AbortJob process of terminating the print process interrupted by the print error without resuming, and terminates the process.

Referring back to FIG. 14, steps from S1209 will be described. When the PictBridge print resumption process has terminated in step S1209, the central controller 207 performs the disconnection notification process in step S1210. Next, the central controller 207 determines in step S1211 whether to resume the print process by the PictBridge print resumption process in step S1209. To resume printing, the central controller 207 returns the process to step S1201 to resume the print process. To terminate the print process without resuming, the central controller 207 returns the display unit 203 to the Idle screen in step S1213 and terminates the process.

Note that the description in the above embodiments is a merely an example, and the present invention is not limited to this. The arrangements and operations in the above-described embodiments can be modified as needed.

For example, in the above-described embodiments, a digital camera has been exemplified as the configuring apparatus. However, the configuring apparatus may be a PDA (Personal Digital Assistant) or a cellular phone. A printer for forming an image on a paper sheet and outputting it has been exemplified as the image output apparatus. However, the image output apparatus may be a projector or a TV set for displaying and outputting an image on a screen.

OTHER EMBODIMENTS

The above-described embodiments can also be implemented as software by the computer (or CPU or MPU) of a system or an apparatus. Hence, a computer program itself which is supplied to the computer to cause it to implement the above-described embodiments also implements the present invention. That is, a computer program itself which implements the functions of the above-described embodiments is also incorporated in the present invention.

The computer program for implementing the above-described embodiments can take any form as far as it is computer-readable. For example, the computer program can be formed as, for example, an object code, a program to be executed by an interpreter, or script data to be supplied to the OS. However, the present invention is not limited to those. The computer program for implementing the above-described embodiments is supplied to the computer via a storage medium or wired/wireless communication. Examples of the storage medium to supply the program are magnetic storage media such as a flexible disk, hard disk, and magnetic tape, optical/magnetooptical storage media such as an MO, CD, and DVD, and a nonvolatile semiconductor memory.

To supply the computer program using wired/wireless communication, a method using a server on a computer network is available. In this case, a data file (program file) that can be the computer program to constitute the present invention is stored in the server. The program file can be either a file in an executable form or a source code. The program file is supplied by causing a client computer to access the server and download the program file. The program file may be divided into a plurality of segment files, and the segment files may be distributed to different servers. That is, the server apparatus for providing the program file to implement the above-described embodiments is also incorporated in the present invention.

Alternatively, a storage medium which stores an encrypted computer program for implementing the above-described embodiments may be distributed. In this case, key information to be used for decryption is supplied to any user who satisfies predetermined conditions to permit the user to install the computer program in his/her computer. The key information can be supplied by, for example, causing the user to download it from a homepage via the Internet. The computer program to implement the above-described embodiments may use the functions of the OS which already runs on the computer. The computer program to implement the above-described embodiments may be formed as firmware such as an expansion board partially attached to the computer or executed by the CPU of the expansion board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171236, filed on Jun. 30, 2008, which is hereby incorporated by reference herein in its entirety.

The invention claimed is:

1. A configuring apparatus for configuring a data processing apparatus, comprising:
   a communication control unit which controls wireless communication between the configuring apparatus and the data processing apparatus connected to the configuring apparatus;
   a detection unit which detects status of a connection with the data processing apparatus, wherein the communication control unit controls the configuring apparatus to receive information about the data processing apparatus from the data processing apparatus if the detection unit has detected establishment of a first connection with the data processing apparatus; and
   a display control unit which displays, on a display unit, a configuration screen to input configurations of a data process in the data processing apparatus based on the information about the data processing apparatus if the detection unit has detected disconnection of the first connection, wherein
   after the configurations of the data process have been input via the configuration screen, and the detection unit has detected establishment of a second connection with the data processing apparatus, the communication control unit controls the configuring apparatus to transmit, to the data processing apparatus, information based on the configurations of the data process input via the configuration screen, and
   if the detection unit has not detected disconnection of the first connection after reception of the information about the data processing apparatus, configurations of the data process via the configuration screen is restricted.

2. The apparatus according to claim 1, wherein if the detection unit has not detected disconnection of the first connection after reception of the information about the data processing apparatus from the data processing apparatus, the display control unit does not display the configuration screen on the display unit.

3. The apparatus according to claim 1, wherein if the detection unit has not detected disconnection of the first connection after reception of the information about the data processing apparatus from the data processing apparatus, the display control unit displays, on the display unit, a screen to prompt disconnection of the first connection.

4. The apparatus according to claim 3, wherein if the detection unit has detected disconnection of the first connection during display of the screen to prompt disconnection of the first connection, the display control unit displays the configuration screen on the display unit.

5. The apparatus according to claim 1, wherein:
   the data processing apparatus is a printer, and
   the information based on the configurations of the data process include at least one of a paper size and information to specify data to be printed.

6. The apparatus according to claim 1, wherein the first connection is a connection of close proximity wireless communication.

7. The apparatus according to claim 1, wherein the first connection is a connection of Near Field Communication (NFC).

8. The apparatus according to claim 1, further comprising:
   an antenna unit;

wherein the communication control unit controls the configuring apparatus to establish the first connection and the second connection using the antenna unit.

9. The apparatus according to claim 8, wherein the antenna unit is used for close proximity wireless communication.

10. The apparatus according to claim 1, wherein:
the data processing apparatus is a primer, and
the information based on the configurations of the data process include a paper size and layouts supported by the primer.

11. A configuring apparatus for configuring a data processing apparatus, comprising:
a communication control unit which controls wireless communication with the data processing apparatus connected to the configuring apparatus;
a detection unit which detects status of a connection with the data processing apparatus, wherein the communication control unit controls the configuring apparatus to receive information about the data processing apparatus from the data processing apparatus if the detection unit has detected establishment of a first connection with the data processing apparatus; and
a designation unit which receives, after reception of the information about the data processing apparatus, designation of data to be transmitted to the data processing apparatus based on the information about the data processing apparatus, wherein
after the designation unit has designated the data, and the detection unit has detected disconnection of the first connection and then establishment of a second connection with the data processing apparatus, the communication control unit controls the configuring apparatus to transmit, to the data processing apparatus, information to specify the data designated by the designation unit, and
if the detection unit has not detected disconnection of the first connection after reception of the information about the data processing apparatus, the designation of the data by the designation unit is restricted.

12. The apparatus according to claim 11, further comprising a display control unit which displays, on a display unit, a configuration screen to receive the designation by the designation unit after the reception of the information about the data processing apparatus.

13. The apparatus according to claim 12, wherein the configuration screen includes a list of data stored in a storage medium of the configuring apparatus.

14. The apparatus according to claim 13, wherein the designation unit receives, from the list of the data included in the configuration screen, the designation of data to be transmitted to the data processing apparatus.

15. The apparatus according to claim 12, wherein if the detection unit has not detected disconnection of the first connection after the reception of the information about the data processing apparatus from the data processing apparatus, the display control unit does not display the configuration screen on the display unit.

16. The apparatus according to claim 12, wherein if the detection unit has not detected disconnection of the first connection after the reception of the information about the data processing apparatus from the data processing apparatus, the display control unit displays, on the display unit, a screen to prompt disconnection of the first connection.

17. The apparatus according to claim 12, wherein if the detection unit has detected disconnection of the first connection during display of the screen to prompt disconnection of the first connection, the display control unit displays the configuration screen on the display unit.

18. The apparatus according to claim 11, wherein the first connection is a connection of close proximity wireless communication.

19. The apparatus according to claim 11, wherein the first connection is a connection of Near Field Communication (NFC).

20. The apparatus according to claim 11, further comprising:
an antenna unit;
wherein the communication control unit controls the configuring apparatus to establish the first connection and the second connection using the antenna unit.

21. The apparatus according to claim 20, wherein the antenna unit is used for close proximity wireless communication.

22. A method of controlling a configuring apparatus for configuring a data processing apparatus, the configuring apparatus including a communication control unit which is to control wireless communication between the configuring apparatus and a data processing apparatus connected to the configuring apparatus, and a detection unit which detects status of a connection with the data processing apparatus, the method comprising the steps of:
controlling, by the communication control unit, the configuring apparatus to receive, from the data processing apparatus, information about the data processing apparatus if the detection unit has detected establishment of a first connection with the data processing apparatus;
displaying, on a display unit, a configuration screen to input configurations of a data process in the data processing apparatus based on the information about the data processing apparatus if the detection unit has detected disconnection of the first connection; and
after the configurations of the data process have been input via the configuration screen, and the detection unit has detected establishment of a second connection with the data processing apparatus, controlling, by the communication control unit, the configuring apparatus to transmit, to the data processing apparatus, information based on the configurations of the data process input via the configuration screen, wherein
if the detection unit has not detected disconnection of the first connection after reception of the information about the data processing apparatus, configurations of the data process via the configuration screen is restricted.

23. A method of controlling a configuring apparatus for configuring a data processing apparatus, the configuring apparatus including a communication control unit which is to control wireless communication with the data processing apparatus connected to the configuring apparatus, and a detection unit which detects status of a connection with the data processing apparatus, the method comprising the steps of:
controlling, by the communication control unit, the configuring apparatus to receive, from the data processing apparatus, information about the data processing apparatus if the detection unit has detected establishment of a first connection with the data processing apparatus;
receiving, after reception of the information about the data processing apparatus, designation of data to be transmitted to the data processing apparatus based on the information about the data processing apparatus; and
after the data has been designated in the step of receiving designation of the data to be transmitted to the data processing apparatus, and the detection unit has detected disconnection of the first connection and then establishment of a second connection with the data processing apparatus, controlling, by the communication control unit, the configuring apparatus to transmit, to the data processing apparatus, information to specify the data designated in the step of receiving designation of the data to be transmitted to the data processing apparatus, wherein if the detection unit has not detected disconnection of the first connection after reception of the information about the data processing apparatus, the designation of the data based on the information about the data processing apparatus is restricted.

* * * * *